(12) United States Patent
Ragone

(10) Patent No.: US 12,360,042 B2
(45) Date of Patent: Jul. 15, 2025

(54) DUVF-MSI BIOPHOTONIC ANALYZER DEVICE AND METHODS FOR DETECTING PATHOGENS ON PLANTS AND MEASURING STRESS RESPONSE

(71) Applicant: Biospection LLC, Wilmington, DE (US)

(72) Inventor: Anthony S. Ragone, Wilmington, DE (US)

(73) Assignee: Biospection LLC, Wilmington, DE (US)

( * ) Notice: Subject to any disclaimer, the term of this patent is extended or adjusted under 35 U.S.C. 154(b) by 249 days.

(21) Appl. No.: 18/001,727

(22) PCT Filed: Jun. 22, 2021

(86) PCT No.: PCT/US2021/038447
§ 371 (c)(1),
(2) Date: Dec. 14, 2022

(87) PCT Pub. No.: WO2022/005812
PCT Pub. Date: Jan. 6, 2022

(65) Prior Publication Data
US 2023/0221254 A1    Jul. 13, 2023

Related U.S. Application Data

(60) Provisional application No. 63/045,578, filed on Jun. 29, 2020.

(51) Int. Cl.
*G01N 21/64* (2006.01)
*G01N 21/31* (2006.01)
(Continued)

(52) U.S. Cl.
CPC ......... *G01N 21/6456* (2013.01); *G01N 21/31* (2013.01); *G01N 21/474* (2013.01);
(Continued)

(58) Field of Classification Search
CPC ............ G01N 21/6456; G01N 21/474; G01N 2021/635; G01N 2021/6419;
(Continued)

(56) References Cited

U.S. PATENT DOCUMENTS

| | | |
|---|---|---|
| 4,806,764 A | 2/1989 | Satake |
| 5,859,435 A | 1/1999 | Satake et al. |

(Continued)

FOREIGN PATENT DOCUMENTS

| | | |
|---|---|---|
| CN | 105158204 A | 12/2015 |
| CN | 205080054 U | 3/2016 |

(Continued)

OTHER PUBLICATIONS

Barbosa et al., "Comparison of Land, Water, and Energy Requirements of Lettuce Grown Using Hydroponics vs. Conventional Agricultural Methods" Int. J. Environ. Res. Public Health 12(6):6879-6891 (2015).

(Continued)

*Primary Examiner* — Kara E. Geisel
*Assistant Examiner* — Roberto Fabian, Jr.
(74) *Attorney, Agent, or Firm* — Medler Ferro Woodhouse and Mills PLLC

(57) ABSTRACT

Methods of deep ultraviolet fluorescence (DUVF) and multi spectral imaging (MSI) detection are disclosed herein for the detection and identification of pathogens on plants. DUV light and visible or near-infrared light are used to illuminate plants or plant leaves such that the light intensity reflected or emitted by the plant or plant leaves can be used to identify the type of pathogen and measure the amount of pathogen on the plant or plant leaves and, additionally, be used to measure the plant's stress response to such pathogen. Also provided herein is a biophotonic analyzer device that uses both DUVF and MSI detection for the monitoring and (Continued)

surveillance of plant health and for the identification and enumeration of pathogens on plants or plant leaves.

19 Claims, 10 Drawing Sheets

(51) Int. Cl.
  *G01N 21/47* (2006.01)
  *G01N 21/63* (2006.01)
  *G01N 21/84* (2006.01)
  *G01N 21/88* (2006.01)

(52) U.S. Cl.
  CPC ... *G01N 21/6486* (2013.01); *G01N 2021/635* (2013.01); *G01N 2021/6419* (2013.01); *G01N 2021/6471* (2013.01); *G01N 2021/8466* (2013.01); *G01N 2021/8845* (2013.01)

(58) Field of Classification Search
  CPC ... G01N 2021/6471; G01N 2021/8466; G01N 2021/8845; G01N 2201/065
  See application file for complete search history.

(56) References Cited

U.S. PATENT DOCUMENTS

| | | | |
|---|---|---|---|
| 5,914,245 | A | 6/1999 | Bylina et al. |
| 7,119,930 | B1 * | 10/2006 | Carstensen ............ H04N 23/56 356/402 |
| 2011/0036995 | A1 * | 2/2011 | Binnie ............... G01N 15/1404 250/461.1 |
| 2011/0147617 | A1 | 6/2011 | Shur et al. |
| 2015/0015697 | A1 | 1/2015 | Redden et al. |
| 2017/0223947 | A1 | 8/2017 | Gall et al. |
| 2017/0311553 | A1 | 11/2017 | Dobrinsky et al. |
| 2019/0277749 | A1 | 9/2019 | Rushing et al. |
| 2019/0377946 | A1 | 12/2019 | Genty et al. |

FOREIGN PATENT DOCUMENTS

| | | | | |
|---|---|---|---|---|
| JP | H03-248045 A | 11/1991 | | |
| JP | H08-327538 A | 12/1996 | | |
| JP | 2016-033467 A | 3/2016 | | |
| JP | 2019197020 A | * 11/2019 | ......... G01N 21/4738 |
| WO | WO 99/42900 A1 | 8/1999 | | |
| WO | WO 2007/016407 A1 | 2/2007 | | |
| WO | WO 2009/140757 A1 | 11/2009 | | |
| WO | 2016/167319 A1 | 10/2016 | | |
| WO | WO 2020/167934 A1 | 8/2020 | | |
| WO | WO 2021/229248 A1 | 11/2021 | | |

OTHER PUBLICATIONS

Fletcher et al., "Human Pathogens on Plants: Designing a Multi-disciplinary Strategy for Research" Phytopathology 103(4):306-315 (2013).

Nandi, et al., "Technoeconomic Analysis of a Transient Plant-Based Platform for Monoclonal Antibody Production" MABS 8(8):1456-1466 (2016).

International Search Report and Written Opinion in international application No. PCT/US2021/038447 mailed Oct. 1, 2021.

* cited by examiner

DUVF-MSI BIOPHOTONIC ANALYZER DEVICE AND METHODS FOR DETECTING PATHOGENS ON PLANTS AND MEASURING STRESS RESPONSE

CROSS-REFERENCE TO RELATED APPLICATIONS

This is a U.S. national filing, pursuant to 35 U.S.C. § 371, of International Application No. PCT/US2021/038447, filed Jun. 22, 2021, which claims the benefit of U.S. Provisional Application No. 63/045,578, filed Jun. 29, 2020, the entire content of each of which is incorporated by reference herein.

FIELD OF THE INVENTION

The present invention relates to devices and methods for the detection of pathogens on plants. In particular, provided herein are devices and methods using deep ultraviolet fluorescence and multi spectral imaging for the rapid detection of pathogens on plants and for measuring the stress response of these plants.

BACKGROUND OF THE INVENTION

As the global population increases, the need for more efficient food production becomes more important than ever before in human history. At the same time, the available space for farming of food crops is rapidly decreasing. In response, indoor crop production methods, such as vertical indoor farming, are on the rise. Indeed, the main goal of vertical farming is to efficiently produce crops in a reduced space, while simultaneously reducing the amount of water and other resources needed to maintain the crops. It is not surprising then, that the compound annual growth rate of indoor crop industries in recent years has increased by 21% in the United States alone resulting in a $10.6 billion dollar industry [Grandview Research, "Vertical Farming Market Analysis Report By Offering (Lighting, Climate Control), By Growing Mechanism (Hydroponics, Aquaponics), By Structure, By Fruits, Vegetables & Herbs, And Segment Forecasts" Report ID: GVR-1-68038-797-1 (2019)]. While these vertical farms are maintained under a controlled environment free from dependence on the weather, the coordinated fusion of natural and artificial inputs require close monitoring of plant health and contamination by pathogens.

In addition to indoor farming, another growing indoor plant industry is plant-based hydroponic farming employed by biopharmaceutical drug producers. This industry has grown by 24% in recent years generating over $392 million in the United States [Nandi et al., "Techno-economic analysis of a transient plant-based platform for monoclonal antibody production" MABS 8(8):1456-1466 (2016); Barbosa et al., "Comparison of Land, Water, and Energy Requirements of Lettuce Grown Using Hydroponic vs. Conventional Agricultural Methods" Int. J. Environ. Res. Public Health 12(6):6879-6891 (2015)]. However, these drug producers need to optimize hydroponic farming methods to increased productivity and product reliability while ensuring product safety to meet the rapidly growing demand for plant-based medicines. Again, precision sensing and monitoring of key process inputs and environmental stresses are essential for optimizing plant health and yield and to prevent pathogen contamination of the final products or the plants themselves.

While the efficiency of resource utilization, environmental control, and plant health monitoring are net benefits of indoor farming, the close proximity and delicate artificial ecosystems could make indoor farms even more vulnerable to pathogen infestations, such as infestations of *Pythium* and other fungal microbes that impact yield performance and safety. Pathogens, such as human pathogens, are even more problematic with regard to crops that will be used for human consumption or for medicinal purposes. Human pathogens, unlike plant pathogens, do not usually kill the plant. As a result, plants contaminated with human pathogens can make their way unnoticed to grocery stores and pharmacies. Indeed, not only do pathogens threaten the yield of crop production, but there have been repeated outbreaks of foodborne illnesses in the United States over the years caused by food crops contaminated by pathogens, such as *Escherichia coli* and *Salmonella* spp. [Fletcher et al., "Human Pathogens on Plants: Designing a Multidisciplinary Strategy for Research" Phytopathology 103(4):306-15 (2013)]. Moreover, whole farms might be infected before the plants exhibit any visible manifestations of the pathogen infection. Therefore, the grower may not know to take remedial measures until the yields are irreparably effected or, even worse, the plants have already made their way to the market with potential for causing human disease or death.

Thus, there remains a need for efficient and rapid monitoring of plant health and, in particular, for the rapid and real time detection of pathogens on plants to enable timely remediation efforts.

SUMMARY OF THE INVENTION

Described herein is a novel method of using deep ultraviolet fluorescence (DUVF) to detect pathogens on plants. In particular, the inventor has discovered that DUVF imaging of plant leaves can be used to detect the presence of human pathogens on plants and even be used to identify the particular pathogen and the concentration of that pathogen. Moreover, the DUVF detection methods of the instant invention can be used in combination with multi spectral imaging (MSI) of the plants to provide information about the plant's stress response due to the pathogen infection. This novel and innovative use of DUVF and MSI technology can be used to generate fluorescence and reflectance profiles for particular varieties of crops, such as those in vertical farms and hydroponic farms, that can be utilized by farmers for rapid and real time detection and identification of pathogens.

Also provided herein is a novel device capable of taking both DUVF and MSI measurements. In particular, a biophotonic analyzer device is provided herein in which both DUV and MSI light sources are included in an integrating cavity for diffuse light distribution and illumination of plants for rapid DUVF and MSI light intensity measurements. As such, the biophotonic analyzer device can be used in a surveillance and monitoring system to ensure rapid detection of pathogen infection to enable prompt remediation measures to be taken to increase crop yields and prevent pathogen-contaminated plants from being incorporated into human foodstuffs and plant-based medicines.

In one aspect of the invention, disclosed herein is a device for detecting a pathogen on a plant or plant part, the device comprising a light distributing element, a light detection system, a control unit, and a calculating module. The light distributing element comprises an integrating cavity with a first opening, a second opening, and an inner surface on which is disposed a diffuse reflective coating. A plurality of light sources are mounted within the integrating cavity and configured to emit light and illuminate an interior of the integrating cavity. Further the integrating cavity is configured to distribute the light emitted from the plurality of light sources through the second opening, the imaging aperture, to illuminate an object sample, such as a plant or plant part (leaves, roots, soil), and the second opening is configured to receive reflected light and emitted light from the object sample, the reflected light or emitted light being directed to the first opening. The light detection system is in optical communication with the first opening and the second opening and configured to receive the light reflected by or emitted by the object sample and includes a camera adapted to supply a representation of recorded images to the calculating module a mirror element in optical alignment with the first opening and the second opening so that the optical axis of the mirror element extends through the first opening and the second opening of the integrating cavity, and wherein the mirror element is configured to divert the light reflected by or emitted by the object sample to the camera. The control unit is configured to cause each of the plurality of light sources to emit light or not emit light, while the calculating module is configured to perform spectral calibration of the representation and record measurements of light intensity of the representation. Furthermore, the plurality of light sources comprises a first light source having a first spectral wavelength in the range of about 250 nm to about 280 nm and a second light source having a second spectral wavelength selected from a range of about 350 nm to about 1000 nm.

In another embodiment, the device is configured for communication with a central processing unit, which converts the measurements of light intensity of the representation into emission intensity data whereby an increase in emission intensity of the first spectral wavelength by the plant or plant part indicates increased pathogen infection on the plant or plant part as compared to an equivalent plant or plant part with no increase in pathogen infection.

In another embodiment, the plurality of light sources comprises at least one additional light source having an additional spectral wavelength selected from a range of about 350 nm to about 1000 nm, provided that the additional spectral wavelength and the second spectral wavelength are not the same spectral wavelength. In other embodiments, the plurality of light sources may comprise 2 to 20 additional light sources, each having an additional spectral wavelength selected from a range of about 350 nm to about 1000 nm, provided that none of the additional spectral wavelengths and the second spectral wavelength are the same spectral wavelength.

In a particular embodiment, the second spectral wavelength is in the range from about 360 nm to about 370 nm and wherein the plurality of light sources further comprises, a third light source having a third spectral wavelength in the range from 400 nm to 410 nm, a fourth light source having a fourth spectral wavelength in the range from 430 nm to 440 nm, a fifth light source having a fifth spectral wavelength in the range from 445 nm to 455 nm, a sixth light source having a sixth spectral wavelength in the range from 465 nm to 475 nm, a seventh light source having a seventh spectral wavelength in the range from 480 nm to 505 nm, an eighth light source having an eighth spectral wavelength in the range from 520 nm to 530 nm, a ninth light source having a ninth spectral wavelength in the range from 545 nm to 555 nm, a tenth light source having a tenth spectral wavelength in the range from 565 nm to 575 nm, an eleventh light source having an eleventh spectral wavelength in the range from 585 nm to 600 nm, a twelfth light source having a twelfth spectral wavelength in the range from 625 nm to 635 nm, a thirteenth light source having a thirteenth spectral wavelength in the range from 640 nm to 650 nm, a fourteenth light source having a fourteenth spectral wavelength in the range from 655 nm to 665 nm, a fifteenth light source having a fifteenth spectral wavelength in the range from 685 nm to 695 nm, a sixteenth light source having a sixteenth spectral wavelength in the range from 765 nm to 775 nm, a seventeenth light source having a seventeenth spectral wavelength in the range from 845 nm to 855 nm, an eighteenth light source having an eighteenth spectral wavelength in the range from 865 nm to 875 nm, a nineteenth light source having a nineteenth spectral wavelength in the range from 935 nm to 945 nm, and a twentieth light source having a twentieth spectral wavelength in the range from 965 nm to 975 nm. In a preferred aspect, each of the plurality of light sources is an LED light.

In a particular embodiment, the control unit causes each individual light source to emit light or not emit light in response to a user programmable input. In other aspects, the control system causes each individual light source to emit light in succession in response to a user programmable input, wherein each light source emits light for a period of time. For instance, the period of time may be from about 0.1 seconds to about 2 seconds.

In an embodiment, the device also includes a light filtering element that is disposed between the mirror element and the camera. The light filtering element typically comprises at least one light permissible member and a plurality of light filters. Further, the control unit causes the light filtering element to switch between the light permissible member and each of the light filters in response to a user programmable input. In some aspects, the light filters transmits light having a transmissible spectral wavelength or range of spectral wavelengths selected from about 300 nm to about 1000 nm.

In another embodiment, the central processing unit facilitates the conversion of the light intensity measurements of the representation into reflection intensity data whereby an increase in reflection intensity of a spectral wavelength other than the first spectral wavelength indicates a decrease in photopigment concentration in the plant or plant part. In yet another embodiment, the central processing unit facilitates the conversion of the light intensity measurements of the representation into emission intensity data whereby an increase in emission intensity of a spectral wavelength other than the first spectral wavelength indicates a change in rate of photosynthesis in the plant or plant part. In some embodiments, the plant or plant part is foliage of the Glade viridiplantae.

The device of the instant invention may also be attached to a conveyor element for moving the device laterally across a plurality of object samples such that light intensity measurements can be taken from each of the plurality of object samples when the second opening is in optical alignment with the sample. For instance, in some embodiments a system for detecting one or more pathogens on a plurality of objects is provided, wherein the system comprises an operation subsystem and at least one device as described above. In such embodiments, the device is attached to a conveyor element for moving the device laterally across a plurality of object samples such that light intensity measurements can be taken from each of the plurality of object samples when the second opening of the device is in optical alignment with the object sample, and, once the light intensity measurements are taken from the object sample, the operation subsystem causes the conveyor element to move the device to the next sample in response to a programmable user input.

In another aspect of the invention, disclosed herein is a method of detecting a pathogen on a plant or plant part using deep ultraviolet fluorescence and multi spectral imaging and includes the steps of providing a plant or plant part and measuring deep ultraviolet fluorescence (DUVF—fluorescence emitted from the plant or plant part from 290-390 nm on excitation.) The measuring step includes subjecting the plant or plant part to an ultraviolet light having a spectral wavelength in the range of about 210 nm to about 280 nm (Deep UV), wherein the plant or plant part emits a DUVF intensity, detecting with a DUVF detection system a first portion of the DUVF intensity, wherein the DUVF detection system comprises a UVF intensity detector and a first DUVF emission filter configured to transmit the first portion of the DUVF intensity, whereby the first portion of the DUVF intensity is transmitted through the first DUVF emission filter and is detected by the DUVF intensity detector, and calculating the first portion of the DUVF intensity, wherein an increase in the first portion of the DUVF intensity indicates a pathogen presence on the plant or plant part as compared to an equivalent plant or plant part without a pathogen presence. In some embodiments, the first DUVF emission filter transmits light having a spectral wavelength of about 335 nm to about 345 nm, and wherein the first portion of the DUVF intensity has a spectral wavelength of about 335 nm to about 345 nm.

The method may also include detecting with the DUVF detection system a second portion of the DUVF intensity, wherein the DUVF detection system comprises a second DUVF emission filter configured to transmit the second portion of the DUVF intensity having a spectral wavelength of about 350 nm to about 370 nm, whereby the second portion of the DUVF intensity is transmitted through the second DUVF emission filter and is detected by the DUVF intensity detector, and calculating the second portion of the DUVF intensity, wherein an increase in the second portion of the DUVF intensity indicates a pathogen presence on the plant or plant part as compared to an equivalent plant or plant part without a pathogen presence.

In another embodiment, the method includes the additional step of measuring light reflected by or emitted from the plant or plant part. This measuring step further includes: (A) subjecting the plant or plant part to a first light having a spectral wavelength in the range of about 350 nm to about 1000 nm, wherein the plant or plant part reflects a portion of the first light to produce a first reflection intensity; (B) detecting with a multi spectral imaging (MSI) detection system the first reflection intensity, wherein the MSI detection system comprises an MSI intensity detector for detecting the first reflection intensity; and (C) calculating the first reflection intensity, wherein an increase in the first reflection intensity indicates a reduction in photopigment concentration in response to a pathogen presence and/or (A) subjecting the plant or plant part to first excitation light having a spectral wavelength in the range of about 350 nm to about 660 nm, wherein the plant or plant part emits a first fluorescence intensity; (B) detecting with the MSI detection system a portion of the first fluorescence intensity, wherein the MSI detection system comprises a fluorescence emission filter whereby the portion of the first fluorescence intensity is transmitted through the fluorescence emission filter and is detected by the MSI intensity detector; and (C) calculating the portion of the first fluorescence intensity, wherein an increase in the portion of the first fluorescence intensity indicates a pathogen presence. This measuring step can be performed before or after the DUVF measuring step discussed in the preceding paragraph.

In some embodiments of the method, the first excitation light has a spectral wavelength in the range selected from group consisting of about 360 nm to about 370 nm, about 400 nm to about 410 nm, 430 nm to about 440 nm, 625 nm to about 635 nm, 640 nm to about 650 nm, and 655 nm to about 665 nm, and wherein the portion of the first fluorescence intensity has a spectral wavelength of greater than 690 nm. In other embodiments of the method, the fluorescence measuring step further includes subjecting the plant or plant part to second excitation light, wherein the plant or plant part emits a second fluorescence intensity; detecting with the MSI detection system a portion of the second fluorescence intensity, whereby the portion of the second fluorescence intensity is transmitted through the fluorescence emission filter and is detected by the MSI intensity detector; and calculating the portion of the second fluorescence intensity, wherein an increase in the portion of the second fluorescence intensity indicates a pathogen presence. In this step, the second excitation light has a spectral wavelength in the range selected from group consisting of about 360 nm to about 370 nm, about 400 nm to about 410 nm, 425 nm to about 435 nm, 625 nm to about 635 nm, 640 nm to about 650 nm, and 655 nm to about 660 nm, provided that the spectral wavelength of the second excitation light is not the same as the spectral wavelength of the first excitation light, and wherein the portion of the second fluorescence intensity has a spectral wavelength of greater than 690 nm.

In some embodiments, both the reflection intensity measuring and fluorescence intensity measuring steps are included in the method. In such embodiments, the reflection intensity measuring step is performed before the fluorescence intensity measuring step, and the portion of the first fluorescence intensity or the second fluorescence intensity is normalized by the first reflectance intensity to calculate a change in photosynthesis (carboxylation) rate according to the equation, where PCi is a constant derived for each type of plant reflectance and the control conditions for the plant.

$$\Delta\text{Rate} = PCi \times \left(\frac{\text{Reflectance}_{(ctrl)}}{\text{Reflectance}_{(meas)} - \text{Reflectance}_{(ctrl)}}\right) \times \text{Emission}\Delta$$

In yet another embodiment, the first light has a spectral wavelength of about 505 nm to about 535 nm, and the reflection intensity measuring step further comprises subjecting the plant or plant part to a second light having a spectral wavelength in the range of about 535 nm to about 560 nm, wherein the plant or plant part reflects a portion of the second light to produce a second reflection intensity; detecting with the MSI intensity detector the second reflection intensity; and calculating the second reflection intensity, wherein an increase in the second reflection intensity indicates a reduction in photopigment concentration in response to a pathogen presence. The reflection intensity measuring step may also include a third light having a spectral wavelength in the range of about 560 nm to about 580 nm, wherein the plant or plant part reflects a portion of the third light to produce a third reflection intensity; a fourth light having a spectral wavelength in the range of about 580 nm to about 610 nm, wherein the plant or plant part reflects a portion of the fourth light to produce a fourth reflection intensity; and so on. In some embodiments, the photopigment is chlorophyll. In yet other embodiments, the plant or plant part is of the clade viridiplantae. In still other embodiments, the plant part is plant foliage.

In some aspects of the invention, the pathogen detected by the method is a human pathogen, such as, but not limited to *Erwinia* sp., *Pseudomonas* sp., *Bacillus* sp., *Clostridium* sp.,

*Klebsiella* sp., *Escherichia* sp., *Salmonella* sp., *Listeria* sp., *Rhizobium* sp., and/or *Sinorhizobium* sp. The method may also include device that combines the DUVF detector system and the MSI detector system, such as the device of the instant invention described above.

In another aspect of the invention, a method of detecting a pathogen on a plant or plant part using deep ultraviolet fluorescence and multi spectral imaging is disclosed herein that utilizes the device described above and includes the steps of a) providing a plant or plant part; b) measuring DUVF emitted from plant or plant part with the device; c) measuring light reflected by the plant or plant part with the device; and d) measuring fluorescence emitted from the plant or plant part with the device. The DUVF measuring step includes subjecting the plant or plant part to an ultraviolet light having a spectral wavelength in the range of about 210 nm to about 280 nm, wherein the plant or plant part emits a DUVF intensity between 290-390 nm; detecting with a light detection system a first portion of the DUVF intensity, wherein the light detection system comprises a light intensity detector and a first DUVF emission filter configured to transmit the first portion of the DUVF intensity, whereby the first portion of the DUVF intensity is transmitted through the first DUVF emission filter and is detected by the light intensity detector; and calculating the first portion of the DUVF intensity, wherein an increase in the first portion of the DUVF intensity indicates a pathogen presence on the plant or plant part as compared to an equivalent plant or plant part without a pathogen presence. The light reflection measuring step includes subjecting the plant or plant part to a first light having a spectral wavelength in the range of about 350 nm to about 1000 nm, wherein the plant or plant part reflects a portion of the first light to produce a first reflection intensity; detecting with the light intensity detector the first reflection intensity; and calculating the first reflection intensity, wherein an increase in the first reflection intensity indicates a reduction in photopigment concentration in response to a pathogen presence. The fluorescence emission measuring step includes subjecting the plant or plant part to first excitation light having a spectral wavelength in the range of about 350 nm to about 660 nm, wherein the plant or plant part emits a first fluorescence intensity; detecting with the light detection system a portion of the first fluorescence intensity, wherein the light detection system comprises a fluorescence emission filter whereby the portion of the first fluorescence intensity is transmitted through the fluorescence emission filter and is detected by the light intensity detector; and calculating the portion of the first fluorescence intensity, wherein an increase in the portion of the second fluorescence intensity indicates a pathogen presence.

In an embodiment, the first DUVF emission filter transmits light having a spectral wavelength of about 335 nm to about 345 nm, and wherein the first portion of the DUVF intensity has a spectral wavelength of about 335 nm to about 345 nm. In another embodiment, the method includes detecting with the light detection system a second portion of the DUVF intensity, wherein the light intensity detector comprises a second DUVF emission filter configured to transmit the second portion of the DUVF intensity having a spectral wavelength of about 355 nm to about 365 nm, whereby the second portion of the DUVF intensity is transmitted through the second DUVF emission filter and is detected by the light intensity detector; and calculating the second portion of the DUVF intensity, wherein an increase in the second portion of the DUVF intensity indicates a pathogen presence on the plant or plant part as compared to an equivalent plant or plant part without a pathogen presence.

In yet another embodiments of the method, the first excitation light has a spectral wavelength in the range selected from group consisting of about 360 nm to about 370 nm, about 400 nm to about 410 nm, 425 nm to about 435 nm, 445 nm to about 455 nm, 625 nm to about 635 nm, 640 nm to about 650 nm, and 655 nm to about 665 nm, and wherein the portion of the first fluorescence intensity has a spectral wavelength of greater than 690 nm. The fluorescence emission measuring step may also include subjecting the plant or plant part to second excitation light, wherein the plant or plant part emits a second fluorescence intensity; detecting with the light detection system a portion of the second fluorescence intensity, whereby the portion of the second fluorescence intensity is transmitted through the fluorescence emission filter and is detected by the light intensity detector; and calculating the portion of the second fluorescence intensity, wherein an increase in the portion of the second fluorescence intensity indicates a pathogen presence. In such an embodiment, the second excitation light has a spectral wavelength in the range selected from group consisting of about 360 nm to about 370 nm, about 400 nm to about 410 nm, 425 nm to about 435 nm, 445 nm to about 455 nm, 625 nm to about 635 nm, 640 nm to about 650 nm, and 655 nm to about 665 nm, provided that the spectral wavelength of the second excitation light is not the same as the spectral wavelength of the first excitation light, and wherein the portion of the second fluorescence intensity has a spectral wavelength of greater than 690 nm.

In another embodiments, the first light has a spectral wavelength of about 505 nm to about 535 nm; and wherein reflection intensity measuring step further comprises subjecting the plant or plant part to a second light having a spectral wavelength in the range of about 535 nm to about 560 nm, wherein the plant or plant part reflects a portion of the second light to produce a second reflection intensity; detecting with the light intensity detector the second reflection intensity; and calculating the second reflection intensity, wherein an increase in the second reflection intensity indicates a reduction in photopigment concentration in response to a pathogen presence. Additionally, this step may also include subjecting the plant or plant part to a third light having a spectral wavelength in the range of about 560 nm to about 580 nm, wherein the plant or plant part reflects a portion of the third light to produce a third reflection intensity; detecting with the light intensity detector the third reflection intensity; and calculating the third reflection intensity, wherein an increase in the third reflection intensity indicates a reduction in photopigment concentration in response to a pathogen presence. Further still, this step may include comprises subjecting the plant or plant part to a fourth light having a spectral wavelength in the range of about 580 nm to about 610 nm, wherein the plant or plant part reflects a portion of the fourth light to produce a fourth reflection intensity.

Other features and advantages of the invention will be apparent by reference to the drawings, detailed description, and examples that follow.

DETAILED DESCRIPTION OF THE INVENTION

Figure 1:
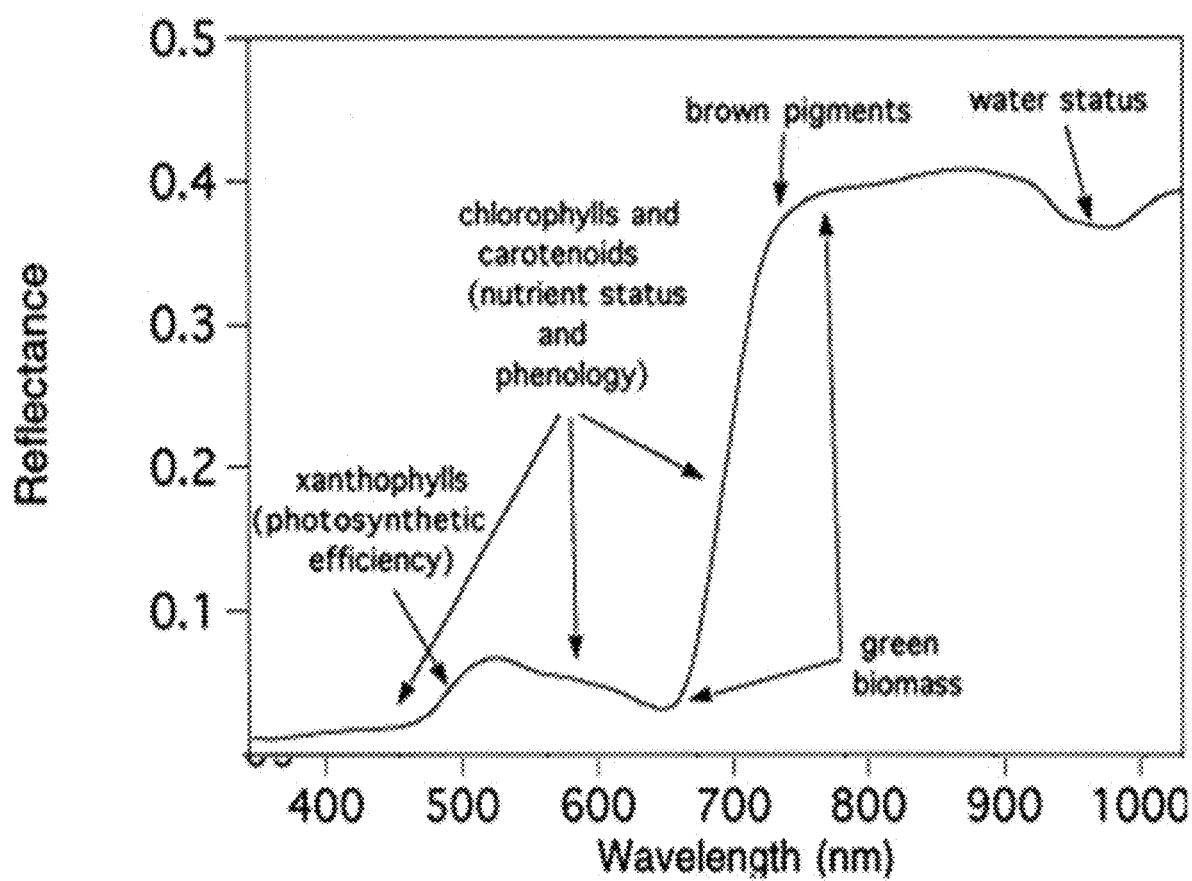
FIG. 1 is a graph of the spectral reflectance intensities for different photopigments as a function of the particular spectral wavelength. The x-axis represents spectral wavelengths of light (nm), and the y-axis represents the reflectance intensity.

Described herein is a novel biophotonic analyzer device and method to rapidly detect and measure both pathogen presence in or on plants and the plant stress response to the presence of pathogens. Notably, the device and method described herein are capable of detecting and measuring human pathogens on plants, including plants used for human consumption or in health or medicinal applications. Accordingly, these measurements can be used to support remediation efforts to improve food quality and prevent contamination in health supplements or medication. In particular, the devices and methods described herein utilize deep ultraviolet fluorescent (DUVF) to detect and measure the presence of pathogens on plants and, in preferred embodiments, can be used in combination with multi-spectral imaging (MSI) to further measure changes in a plant's photopigment activity and rate of photosynthesis as indicators of stress response due to the pathogen infection. These devices and methods can be used to create DUVF and MSI profiles for specific varieties of plants that can be used as benchmarks for rapid, real-time identification and measurement of pathogen infection and stress response in those plant varieties.

The methods provided herein include subjecting a plant or plant part to one or more light sources and measuring the intensity of the light reflected by and/or emitted from the plant or plant part, which is then used in a unique and innovative way to determine the presence of a pathogen and/or measure the concentration of a pathogen, such as a human pathogen, on the plant or plant part and further to measure the plant's stress response to the pathogen. In particular embodiments, the method entails subjecting the plant or plant part to DUV light and measuring the fluorescence emitted by the pathogen microbe, plant or plant part in response to DUV light. As explained in more detail below, this fluorescence intensity can be used to detect the presence and concentration of a pathogen on the plant and further can be used to measure an increase or decrease in pathogen infection on the plant over time. In preferred embodiments, the method additionally includes subjecting the plant to one or more light sources (i.e., visible light or near infra-red light) having different spectral wavelengths and measuring the intensity of the light reflected and/or the fluorescence emitted by the plant or plant part in response to the light exposure. As explained in more detail below, the intensity of the reflected light/emitted fluorescence can be used to measure the stress-response of the plant as a result of the pathogen infection. In particular, the absorption of certain spectral wavelengths of light by photopigments (e.g., chlorophyll A, chlorophyll B, anthocyanin, carotenoid) can be used to measure the plant's stress response to levels of pathogen infection. While the light source exposure can be performed using any number of techniques, a particular embodiment of the invention features the use of a novel biophotonic analyzer device capable of emitting both DUV light and visible/infra-red light for use with the present methods of analysis.

The biophotonic analyzer device of the present invention includes a series of light sources ranging in spectral wavelength from DUV to near infra-red, which are used to detect and enumerate the pathogens presence on the plant foliar surface in real time and to determine the plant photosynthetic state, photopigments, water, and vascular responses to pathogens. In particular, the biophotonic analyzer device presented herein is the first to incorporate DUVF and MSI in a single device for real time reflective and fluorescence imaging of a plant foliar surface. Moreover, the novel design allows for successive light and fluorescence imaging for a multitude of spectral wavelengths in a rapid and efficient manner to enable the user to measure several parameters of pathogen infection and stress response and monitor plant health. In this manner, the present device and methods can be used with both traditional farming as well as in vertical farming, hydroponics, greenhouses, and laboratories to predict and improve plant growth, productivity, and quality control. Thus, steps for remediation of early-stage pathogen infection and stressors can be taken before visible symptoms appear on the plants, which often appear too late to salvage yield or the nutritional/medicinal qualities of the plants being grown.

The biophotonic analyzer device of the instant invention includes, among other things, a light distributing component, a light detection or imaging system, and a control system that includes programmable elements for operation of the light sources. The control system further includes a calculating module or is linked to a central processing unit (CPU) that contains a calculating module for running software that calibrates the image data. In particular, the calibration program segments light intensity reflected from or emitted by the plant from the background light noise from soil and other surfaces or segment image data from certain plant anatomy. The calculating module further translates the imaging data into light intensity measurements which can be used to determine the presence of pathogens and the level of pathogen infection as well as the plant stress response to the pathogen. The light distributing component includes an integrating cavity with a hollow interior compartment configured for distribution of light. To this end, the integrating cavity will have a sloped or rounded inner surface. In preferred embodiments, the inner surface of the integrating cavity is spherical or ball-shaped. Also, the integrating cavity will have a top opening, or imaging port, and a bottom opening, or object port (or viewing aperture), with the both openings being positioned substantially along the same optical axis, which can also be referred to as substantially in optical alignment.

In operation, the device is placed over an object, such as a plant or plant part, such that the object is directly underneath the object port to allow light to be emitted from the integrating cavity to the object and further to allow light reflected or emitted by the object to return through the view port and through the imaging port to the light detection or imaging system. The inner surface of the integrating component is preferably coated with a light diffuse reflective coating so that light emitted in the interior will uniformly illuminate the interior. The inner surface of the integrating cavity will include a plurality of light sources (e.g., LED lights) preferably mounted circumferentially around the equator of the inner surface. Each of the light sources will produce light of a specific spectral wavelength ranging from DUV to near infrared. The light sources can be turned on and off (e.g., in a stroked or sequential manner) by the control system.

The light detection or imaging system is disposed on the top surface of the integrating cavity and includes an imaging camera and, preferably, a mirror. The mirror is in optical alignment with the imaging port and the view port and directs light reflected or emitted by the object from the integrating cavity to the imaging camera. In some embodiments, the imaging camera is placed in direct optical alignment with the imaging port of the integrating cavity and, thus, no mirror is needed. However, the inclusion of the mirror component alleviates the need to position the imaging camera directly above the integrating camera thereby allowing the anchoring of the device to, e.g., an overhead conveyor line or drone, while decreasing the height needed for system implementation. The light detection or imaging system may also include one or more emission filters for fluorescence imaging. In one particular embodiment, the light detection or imaging system includes a filter wheel comprising multiple emission (fluorescence) filters, each configured for transmission of a particular wavelength or range of wavelengths. The filter wheel is enabled to spin and switch between no filter and emission filters of different transmission wavelengths. The methods and devices of the instant invention will be described in more detail below.

Definitions

Unless defined otherwise, all technical and scientific terms used herein have the same meaning as those commonly understood by one of ordinary skill in the art to which this invention belongs. Standard techniques are used unless otherwise specified. Although methods and materials similar or equivalent to those described herein can be used in the practice or testing of the present disclosure, suitable methods and materials are described below. The materials, methods and examples are illustrative only, and are not intended to be limiting. All publications, patents and other documents mentioned herein are incorporated by reference in their entirety.

Ranges, if used, are used as shorthand to avoid having to list and describe each and every value within the range. Any value within the range can be selected, where appropriate, as the upper value, lower value, or the terminus of the range.

As used herein, the singular forms "a," "an," and "the" include the plural referents unless the context clearly indicates otherwise. Likewise, the terms "include", "including", and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "about" refers to the variation in the numerical value of a measurement, e.g., diameter, concentration, percentage, wavelength, etc., due to typical error rates of the device used to obtain that measure. In one embodiment, the term "about" means within 5% of the reported numerical value, preferably, the term "about" means within 3% of the reported numerical value.

The term "comprising" is intended to include embodiments encompassed by the terms "consisting essentially of" and "consisting of" Similarly, the term "consisting essentially of" is intended to include embodiments encompassed by the term "consisting of."

The term "controlled environmental conditions" means that the plant or plant part being analyzed is kept under environmental conditions where one or more of the temperature, humidity, sunlight exposure, soil conditions, etc., are controlled and monitored, such as in a greenhouse, vertical farm, hydroponic system, and the like. For instance, a DUVF and/or MSI intensity profile can be developed for a specific plant in "controlled environmental conditions" and used as a benchmark for comparison to a test plant under the same "controlled environmental conditions" such that changes in DUVF and/or MSI intensity are indicative of a pathogen infection or the plant's stress response to the pathogen.

The term "integrating" as used herein to refer to a sphere or cavity means an optical component consisting of a hollow spherical cavity with its interior covered with a diffuse light reflective coating, with openings for entrance and exit ports. Its relevant property is a uniform light scattering or diffusing effect.

The term "substantially" when used in reference to an optical axis or optical alignment means that two components or features that are in close enough optical alignment such that the light path or images created by the light path is not significantly altered. For instance, two components that are "substantially on the same optical axis" might be off perfect alignment by 5% or less; preferably, less than 1%.

DUVF Detection/Imaging

In one aspect of the invention, DUVF imaging is performed on a plant or plant part. It has been discovered that pathogen presence/infection of the plant or plant part can affect the intensity of fluorescence emission from the plant in response to DUV light. In fact, the inventor has discovered that DUVF imaging can detect the presence of human pathogens on plants and in concentrations as low as about 10 colony forming units per milliliter (cfu/ml); preferably at least about 100 cfu/ml. While not intending to be bound by theory, the ability to detect and measure human pathogen presence on plants using DUVF imaging is due mainly to high concentrations of unsaturated amino acids, such as tryptophan, tyrosine, and phenylalanine produced by these pathogens. As human pathogens do not kill the plants, the ability to detect such low levels of human pathogens on plants was very surprising. DUVF intensity can therefore be used to determine whether a plant is infected with a human pathogen and/or the estimated concentration of that pathogen and can be used to measure an increase or decreases in that pathogen infection over time. In preferred embodiment, the plant or plant part is from the clade viridiplantae, which include the green land plants and algae. However, as would be readily understood by the skilled artisan in view of the guidance provided herein, the present devices and methods can be adapted for use with any type of plant, soil samples, or wastewater.

The method of the present invention can be used to detect the presence of a variety of pathogens including, but not limited to *Erwinia* sp., *Pseudomonas* sp., *Bacillus* sp., *Clostridium* sp., *Klebsiella* sp., *Escherichia* sp., *Salmonella* sp., *Listeria* sp., *Rhizobium* sp., *Sinorhizobium* sp., and the like, each of which include one or more species or subspecies that are harmful to humans and can decrease the quality of foodstuffs and medicines and, in many cases, cause illness and even death. Therefore, rapid and early detection of pathogens on plants, especially those used for human food or medicines, can not only allow for immediate remediation to increase plant survival and yields, but prevent human sickness due to consumption of infected plants.

As noted above, the present method utilizes DUV light for detecting and measuring pathogens on plants or plant parts. Ultraviolet (UV) is a form of electromagnetic radiation with a spectral wavelength from about 10 nm to about 400 nm, which is below the visible light spectrum. UV light having wavelengths towards the longer end of this range facilitate chemical reactions that cause many substances to glow or fluoresce. Therefore, as UV of a certain spectral wavelength impacts and is absorbed by a substance, the substance can emit light or other electromagnetic radiation of a longer wavelength (i.e., lower energy) that can be detectable by a suitable fluorescence detection or imaging system. Of particular preference in the present methods, is the use of DUV light, which has a spectral wavelength of about 200 nm to about 280 nm, e.g., 200 nm, 210 nm, 220 nm, 230 nm, 240 nm, 250 nm, 260 nm, 270 nm, or 280 nm; preferably, the DUV light has a spectral wavelength of about 250 nm to about 280 nm. In one particular embodiment, the DUV light used in the present methods has a spectral wavelength of about 265 nm or about 270 nm.

The DUV light source can be generated using light sources available in the art, including, but not limited to, a mercury-vapor lamp, laser diode, LED light, or any light source capable of emitting UV light with the appropriate spectral wavelength. Alternatively, a light source can be combined with an excitation light filter design to transmit only light having the desired DUV spectral wavelength. Preferably, the DUV light source is generated from an LED configured to emit DUV and/or longer wavelength UV light (300-400 nm). In particular embodiments, when the DUV light is directed to a plant or plant part (e.g., the plant foliage), the plant absorbs the DUV light and emits lower energy electromagnetic radiation. The emitted light (or fluorescence) can then be detected using photodetector or an imaging camera (e.g., digital camera, analog camera, color or monochrome camera, or CCD camera) in combination with one or more optical filters. Optical filters (also referred to herein as "emission filters" or "fluorescence filters" when used with fluorescence detection/imaging) are available in the art and are designed to selectively transmit light of different spectral wavelengths. In this manner, imaging can be performed to measure fluorescence intensity of a particular spectral wavelength.

Optical filters suitable for use herein include longpass filters, shortpass filters, band-pass filters, and dichroic filters. Dichroic filters are typically made by coating a glass substrate with a series of optical coatings and function to reflect the unwanted portion of the light while transmitting the remainder. A longpass (LP) filter is an optical interference or colored glass filter that attenuates light having shorter wavelengths and transmits light having longer spectral wavelengths over the active range of a target spectrum. On the other hand, shortpass (SP) filters are optical interference or colored glass filters that attenuate light having longer spectral wavelengths while transmitting light having shorter spectral wavelengths. Band-pass filters transmit only a certain spectral wavelength band or a narrow range of spectral wavelength bands while blocking all others.

In one embodiment, DUV light having a spectral wavelength of about 200 nm to about 280 nm, preferably, having a spectral wavelength of about 250 nm to about 280 nm, is directed to a plant or plant part (e.g., foliage). In response, the plant or plant part will emit fluorescent light, which can be detected using a suitable detection system, such as an imaging camera or a photodiode with the appropriate emission filter, such as a narrow bandpass filter. For instance, a photodiode with a narrow bandpass filter can detect emission intensity of a particular spectral wavelength in response to DUV excitation (e.g., 320 nm, 340 nm, 360 nm, or 380 nm), whereas, if images of the plant or plant part structure is desired, an imaging camera with appropriate emission filters will be used. Suitable emission spectra for use herein will have a spectral wavelength from about 300 nm to about 400 nm; preferably, between about 320 nm and about 385 nm, e.g., about 315 nm to about 325 nm, about 335 nm to about 345 nm, about 355 nm to about 365 nm, or about 375 nm to about 385 nm. For instance, in one particular embodiment, emission spectra having wavelengths of about 320 nm, 340 nm, 360 nm, or 380 nm are used to detect the presence of a pathogen on the plant or plant part. As shown in more detail in the examples, the presence of a pathogen will result in increased fluorescence intensity across these emission spectra. Therefore, by comparing an infected plant to an uninfected plant or a standard DUVF intensity profile for that particular variety, the user can detect the presence of a pathogen on the plant by measuring the amount of DUVF. Moreover, the DUVF intensity level can also be used to estimate the amount of pathogen present on the plant. Further, once a baseline DUVF for a particular plant is obtained, the increase or decrease of pathogen infection can be monitored in real time.

In one embodiment, the presence of a pathogen increases the DUVF intensity of a plant or plant part by at least 3% as compared to an equivalent uninfected plant or plant part. In other embodiments, the presence of a pathogen increases the DUVF intensity of a plant or plant part by 5% as compared to an equivalent uninfected plant or plant part. In yet other embodiments, the presence of a pathogen increases the DUVF intensity of a plant or plant part by 10% as compared to an equivalent uninfected plant or plant part. The method of measuring DUVF intensity can detect even a small concentration of a pathogen on the plant or plant part. In some embodiments, pathogen concentration less than or equal to $10^7$ cfu/ml can be detected; preferably less than or equal to $10^6$ cfu/ml; or less than or equal to $10^5$ cfu/ml; or less than or equal to $10^3$ cfu/ml, or less than or equal to 10 cfu/ml. For instance, pathogen concentrations as low as about 10 to 100 cfu/ml can be detected.

Another aspect of the DUVF method is that the DUVF intensity can be used to differentiate between certain species of pathogens. For instance, as shown in the examples, *Salmonella enterica* in water has a different DUVF profile as compared to *Pseudomonas syringae* DC3000 or *Bacillus subtilis* UD 1022. Likewise, plants infected with different pathogens will exhibit differentiated DUFV profiles. For instance, Black Seeded Simpson lettuce will produce a different DUVF profile when infected with *S. enterica*, *Listeria innocua*, or *B. subtilis* UD 1022. As such, the method described herein can be used to create specific DUVF intensity benchmarks or profiles of specific pathogen infection of particular plants or plant varieties. These benchmarks or profiles can be stored in a database and used for rapid, real time detection of pathogen presence on plants, the identification of the specific pathogen, and the determination of pathogen concentration.

To illustrate further, suppose the plant of interest to the practitioner of the present method is Black Seeded Simpson lettuce. The practitioner takes DUVF measurements of multiple Black Seeded Simpson lettuce plants in controlled environmental conditions (e.g., a greenhouse or vertical farm with a stable atmospheric pressure, temperature, humidity and the like) to create an average baseline DUVF value for uninfected Black Seeded Simpson lettuce. Further, the practitioner can take DUVF measurements of multiple Black Seeded Simpson lettuce plants in the same controlled environmental conditions after dosing with water and compare the intensity measurements to a set of black Seeded Simpson lettuce plants dosed with known concentrations of, e.g., *S. enterica*. As shown in the examples, the uninfected Black Seeded Simpson lettuce will have a specific DUVF intensity profile that can be differentiated from a plant infected with *S. enterica* under the same controlled environmental conditions. Moreover, the DUFV profiles for the same plant can be differentiated among plants infected with different concentrations of *S. enterica*. These DUFV profiles can be compiled and stored in a database for use in monitoring and surveillance. Therefore, when a Black Seeded Simpson lettuce plant in the same controlled environment is subjected to DUFV analysis, the DUFV intensity measurements can be compared to the DUFV profile database to enable the user to rapidly, and in real-time, determine whether the black Seeded Simpson lettuce plant is infected with *S. enterica* and the level of infection.

DUVF intensity profiles can be generated similarly for different concentrations of other pathogens, such as those described above. Thus, an entire DUVF intensity profile for Black Seeded Simpson lettuce can be generated. Therefore, when the method is used in practice, the DUVF measurements taken of a particular Black Seeded Simpson lettuce plant can rapidly inform the user of whether the plant is infected with a pathogen and, if so, the identity and approximate concentration of the pathogen. As will be readily understood by the skilled artisan, this method can be applied to other varieties of lettuce, e.g., Romain Lettuce, or any other plant of interest, e.g., varieties of spinach, cabbage, kale, collard greens, beet greens, arugula, endive, Bok Choy, turnip greens, *Arabidopsis*, and the like.

Therefore, the DUVF analysis method described herein will allow farmers, growers, scientist, drug producers, and herbalists to develop pathogen profiles for their plants of interest and to monitor their plants for pathogen infection in real time. Indeed, the present method of DUVF analysis has extremely useful applications in agriculture, medicine, and food technology.

MSI Detection Method

In particular embodiments, the DUVF analysis of the present invention is used in combination with multi-spectral imaging (MSI) of the plants. MSI is used herein to measure and/or monitor plant foliar stress responses to pathogen infection. MSI can be used as well to assess both abiotic (environmental) stresses, such as, but not limited to, drought and nutrient deprivation and biotic stresses, such as, but not limited to, disease or insects. As demonstrated herein, pathogen infection causes a direct measurable stress response, e.g., changes in light absorption by chlorophyll A and B or other photopigments and/or changes in water absorption. As such, MSI utilizes light reflection and/or emission to detect and quantify photopigment and photosynthetic response of a plant to stress caused by pathogens. Thus, the present methods allow for detection and monitoring of both the presence of a pathogen and the direct plant foliar stress caused by the pathogen.

When a healthy plant grows and takes in light and water, photopigments present in the plant's photosynthesis machinery will absorb the light at particular spectral wavelengths. Thus, after watering, the plant's photopigment light absorption will increase over time. On the other hand, when a plant is infected with a pathogen, the plant's photopigment activity will tend to decrease in response to the infection (i.e., a stress response), which can be measured by a decrease in light absorption over time or, conversely, an increase in light reflection as the photopigment's ability to utilize light energy is impaired. Thus, by subjecting a plant or plant part to light having appropriate spectral wavelengths, the user can measure the plant's stress response.

As noted above, MSI analysis of a plant or plant part involves subjecting the plant or plant part one or more spectral wavelengths of light. The MSI spectra ranges from about 350 nm to about 1,000 nm, e.g., 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, or 1000 nm. In some aspects, the plant or plant part is subjected to one or more light sources emitting different spectral wavelengths of light, depending on the photopigment to be measured. In others, the plant or plant part is subjected to 2, 3, 4, 5, 6, 7, 8, 9, 10, 11, 12, 13, 14, 15, 116, 17, 18, 19, 20, or more, lights sources or 20, 30, 40, 50, 60, 70, 80, 90, 100 or more lights sources. For instance, in one particular embodiment, the plant or plant part is subjected to 2-19 light sources having different spectral wavelengths of light. Depending on the presence and concentration of certain photopigments in the plants or plant parts, certain spectral wavelengths of light are absorbed better than others. Those spectral wavelengths of light that are not well absorbed will have increased reflection. For instance, the plant photopigments chlorophyll A and chlorophyll B absorb light in the red and blue spectral ranges very well, with a peak absorption in the blue band at about 435 nm (Soret band) and peak absorption in the red band at about 635 nm and about 662 nm (Qx band and Qy band, respectively). Conversely, chlorophyll tends to reflect light in the green spectral range (about 495 to about 570 nm) thus giving many green plants their color. Exemplary photopigments present in plants and the spectral wavelengths with the highest reflection intensity and absorption spectra are summarized in Table 1 and FIG. 1.

TABLE 1

Exemplary photopigments

| Photopigment | Reflected Spectra (nm) | Absorbed Spectra (nm) (max absorption) |
|---|---|---|
| Chlorophyll A | 495-670 | 380-495 (432), 625-740 (662) |
| Chlorophyll B | 515-640 | 380-495 (453), 625-740 (642) |
| Anthocyanins | 370-540, 560-700 | 465-550 (310, 505) |
| Carotenoids | >510 | 410-540 (460, 485) |

As discussed above, it has been discovered that the presence of pathogen-related stress in a plant causes changes in the plant's photopigment concentration and photosynthesis function. Photopigment concentrations and growth rates slow and reverse in infected plants depending on the concentration of the pathogen. In particular, the presence of a pathogen in or on the plant or plant part will result in a decrease in the amount of light the photopigment can absorb and a proportionate increase in the reflection of that light. As such, MSI analysis can be used to measure this photopigment stress-response. The present method is a novel and innovative approach to utilizing these measurements to determine the plant's stress response to pathogen infection and can be used in combination with DUVF to monitor these plants in real time.

The MSI method may include subjecting the plant or plant part to several different spectral wavelengths of light and measuring the reflection intensity, which, in turn, provides information about the concentration and function of certain photopigments. One or more sources of light having the desired spectral wavelengths can be generated by laser diodes, excitation filters that transmit light of a specific spectral wavelengths, LEDs, and the like. The light source, such as a laser diode or LED, will emit light of a particular wavelength and directed to the plant or plant part, and the reflection image can be captured using an art standard imaging camera or light intensity detector as described above. Notably, an emission filter is not required for imaging at this step since the light source emits only the desired spectral wavelength. Therefore, the light reflected should be approximately the same spectral wavelength as the light emitted.

Light sources emitting light in the spectral wavelength from about 495 nm to about 640 nm will tend be reflected by the chlorophyll A and B photopigments and produce large reflection intensity profiles in this spectral range. As such, the light reflection intensity in this spectral range is easily detectable using available imaging or photodetection techniques. A further increase in reflection of these spectral wavelengths as compared to a control profile or baseline level is an indication of decreased concentration and/or light-absorption function of these particular photopigments. Likewise, light sources emitting light having spectral wavelengths greater than about 510 nm will be reflected by the carotenoid photopigment, and an increase in reflection intensity may indicate a decrease in concentration and/or function of the carotenoid photopigment. Finally, light sources emitting light in the spectral wavelength from about 370 nm to about 540 nm or from about 560 nm to about 700 nm will be reflected by the anthocyanin photopigment, and an increase in reflection intensity may indicate a decrease in concentration and/or function of the anthocyanin photopigment. In addition to photopigment light reflection and absorption, other stress responses such as water absorption concentration can be measured as an increase in reflected light having a spectral wavelength from about 940 to about 965 nm (the max absorption band is about 950 nm). As will become apparent from this disclosure, the inventor has elucidated mathematical relationships between light reflection intensity and fluorescence emission intensity and photopigment absorption and function. Accordingly, the reflection intensity data for a particular spectral wavelength can be converted to a photopigment absorption concentration according to the following Equation 1:

$$\text{Absorption} = C_{(ctrl)}/\text{reflection} \qquad \text{[Equation 1]}$$

In this equation, $C_{(ctrl)}$ is a constant for each plant type and is determined through plant evaluations with both MSI and absorption detection sensors. The relatively high intensity of the light being reflected by the plants enables the use of relatively short emitted light exposure times sufficient for adequate light intensity detection and imaging. In some embodiments, the different light sources can be turned on in a successive or stroked manner such that the plant or plant part is subjected to each particular spectral wavelength for a brief period of time, e.g., 0.1 seconds, 0.2 seconds, 0.3 seconds, 0.4 seconds, 0.5 seconds, 0.6 seconds, 0.7 seconds, 0.8 seconds, 0.9 seconds, 1 second, or more. As each light source is turned on, the light intensity detector (e.g., digital camera) captures the image of the plant or plant part such that the intensity of the reflective light can be measured. Then, that light source is turned off while the next light source in succession is turned on to illuminate the plant or plant part for reflection intensity detection and measurements of the next spectral wavelength, and so on. In a preferred embodiment, the activation of the light source and the image capture/measuring is controlled by a programmable system so that the user can select the desired number of light sources for which to capture the light intensity measurements. Accordingly, the short emitted light exposure time allows for the user to take measurements with a large number of spectral wavelengths in a short period of time. For instance, in one particular embodiments, the user can take light reflection measurements for 19 different spectral wavelengths in less than about 5 seconds with a VideometerLab® MSI (Videometer A/S, Copenhagen, Denmark).

In a preferred embodiment, light reflection intensity measurements are captured for spectral wavelengths optimal for detecting and calculating photopigment development and activity for a variety of different photopigments. For green plants, these photopigments include, among others, chlorophyll A and B, carotenoid, and anthocyanin. The light sources that are activated during the MSI method may include those having an emitted spectral wavelength selected from the range of 350 nm to about 1,000 nm. For instance, in one non-limiting exemplary embodiment, light sources, such as LEDs, having spectral wavelengths of about 365 nm, 405 nm, 430 nm, 450 nm, 470 nm, 490 nm, 525 nm, 550 nm, 570 nm, 590 nm, 630 nm, 645 nm, 660 nm, 690 nm, 770 nm, 850 nm, 870 nm, 940 nm, and 970 nm are used. The plant or plant part, such as the foliage of a leafy green plant (e.g., lettuce, spinach), is subjected to each of these spectral wavelengths in succession for a brief period of time (e.g., 0.1-0.5 seconds each) while the image of the plant or plant part is captured by a digital camera. The intensity of the reflected light for each spectral wavelength is then measured and the reflection intensity and absorption concentration is calculated as described above.

The presence of a pathogen will cause the photopigments of the plant to reflect a higher concentration of light as compared to an uninfected plant under the same controlled environmental conditions. In turn, the light reflection intensity can be used to estimate the light absorption capability of that photopigment according to Equation 1. For instance, an increase in reflection of spectral wavelengths from, e.g., about 525 nm to about 590 nm, indicate a decrease in absorption of this light and, therefore, a decrease in chlorophyll AB concentration and/or function in response to the pathogen infection.

As with the DUVF method, the MSI method of the instant invention can be used to generate reflection intensity profiles for different plants infected with different pathogens. To use the same non-limiting example discussed above, the practitioner takes MSI reflection intensity measurements for multiple Black Seeded Simpson lettuce plants in controlled environmental conditions to create an average baseline reflection intensity value. Further, the practitioner can take MSI reflection intensity measurements of multiple Black Seeded Simpson lettuce plants in the same controlled environmental conditions after dosing with water and compare the intensity measurements to a set of Black Seeded Simpson lettuce plants dosed with known concentrations of, e.g., S. enterica to create another value. Data sets can be generated similarly for different concentrations of S. enterica and/or for different concentrations of other pathogens, such as those described above. Thus, an entire MSI reflection intensity profile for Black Seeded Simpson lettuce can be generated. This can be carried out for any number of plant varieties to create a library of MSI reflection intensity profiles for storage in a database.

Moreover, this data can be used to generate absorption modelling based directly on inverse reflection and expressed as a percentage change in absorption for a particular plant type (e.g., Black Seeded Simpson lettuce, Romaine lettuce, *Arabidopsis*, etc.) and a specific photopigment (e.g., chlorophyll A, anthocyanin, etc.) according to Equation 2:

$$\text{Abs}\Delta = C_{(ctrl)} / \left(1 + \left(\frac{\text{Reflection}_{(meas)} - \text{Reflection}_{(ctrl)}}{\text{Reflection}_{(ctrl)}}\right)\right) \quad \text{[Equation 2]}$$

Reflection$_{(meas)}$ is the average of reflection intensities at a particular wavelength(s) for the specific photopigment being measured (e.g., chlorophyll A at 645 and 660 nm) for at least four test plants of a particular variety. The same area on each of the test plants, such as the same leaves, is measured after exposure to a certain stress, such a pathogen infection, with all other environmental variables being controlled. Reflection$_{(ctrl)}$ is the average of reflection for at least four control plants of the same variety of plant under the same controlled environmental conditions. $C_{(ctrl)}$ is a normalization coefficient usually set to a known value for the particular plant of interest (e.g., from SPAD 502 chlorophyll meter measuring chlorophyll (Konica Minolta, U.S.A.)).

In some particular embodiments, MSI reflected light intensity measurements are taken from green plants using a light source having a spectral wavelength from about 525 nm to about 590 nm, e.g., 525 nm, 530 nm, 535, nm, 540 nm, 545 nm, 550 nm, 555 nm, 560 nm, 565 nm, 570 nm, 575 nm, 580 nm, 585 nm, or 590 nm, to measure concentration and/or function of chlorophyll A/B in the plant. Preferably, the spectral wavelengths of the light source(s) are about 525 nm, 550 nm, 570 nm, and/or 590 nm for measuring the light reflection by chlorophyll. In such embodiments, an increase in reflection or decrease in absorption of light at these wavelengths as compared to a baseline or benchmark value indicates a decrease in chlorophyll A/B photopigment concentration and/or function. Moreover, a measured decrease in chlorophyll A/B photopigment concentration or function of at least 1% indicates pathogen infection. In other embodiments, a measured decrease in chlorophyll A/B photopigment of at least 5% indicates pathogen infection. As shown in the examples that follow, this method can be used in combination with DUVF to measure increases in pathogen infection over time and differentiate between different pathogens, such as *L. innocua*, *S. enterica*, *P. syringae* DC3000, or *B. subtilis* UD 1022.

In addition to light reflection, the MSI method provided herein may also utilize fluorescence imaging to measure, for example, photosynthesis activity and predicted electron transfer rate index changes in plants in response to pathogen infection. In this embodiment, the excitation light source is absorbed by the plant or plant part, which is emitted by the plant in the form of lower energy wavelengths and detected using the light intensity detection systems in combination with the appropriate emission filter. Further, unlike the MSI method for detecting reflected light, which has about 5 to 20-fold greater intensity than fluorescence, MSI fluorescence detection requires a longer period of plant exposure to the excitation light. As such, each light source used for emission detection is pulsed for about 0.5 seconds to about 2 seconds, e.g., 0.5 seconds, 0.6 seconds, 0.7 seconds, 0.8 seconds, 0.9 seconds, 1.0 seconds, 1.1 seconds, 1.2 seconds, 1.3 seconds, 1.4 seconds, 1.5 seconds, 1.6 seconds, 1.7 seconds, 1.8 seconds, 1.9 seconds, or 2.0 seconds.

For MSI fluorescence intensity data, the plant or plant part is subjected to excitation light of one or more spectral wavelengths ranging from 350 nm to about 660 nm, e.g., 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, or 660 nm. However, for these measurements, light emission filters are used to detect and measure the intensity of only particular spectral wavelengths of light emitted by the plant or plant part in response to the excitation light. The fluorescence emitted from the subject plant or plant part is then transmitted to the photodiode or digital imaging camera by the emission filters. Suitable emission filters are selected based on the desired spectral wavelength of fluorescence to be measured and can include, longpass filters, shortpass filters, band-pass filters, and dichroic filters. For instance, fluorescence emission spectra having wavelengths greater than about 690 nm can be detected using a suitable long pass emission filter with an imaging camera.

In one embodiment, photosystem II (PSII) emission intensity from plants or plant parts is measured using the MSI method of the instant invention. For PSII, the chlorophyll photopigment molecules (ChlA and/or ChlB) create the fluorescence emission. In plants, this emission is typically caused by stress proportional to the excess energy the plant cannot use in photosynthesis. The rate at which these plants fluoresce and the number of molecules available to emit fluorescence must be accounted for to calculate change in stress. In other words, a given level of PSII fluorescence emission intensity is due to both the photopigment concentration (i.e., the fluorophore concentration) and the amount and type of stress (e.g., pathogen infection).

In such an embodiment, the plant or plant part is subjected to excitation light from, e.g., an LED light source, having a spectral wavelength at or around the Soret peak band (about 435 nm), the Qx peak band (about 635 nm), and/or the Qy peak band (about 662 nm). For instance, the plant or plant part can be subjected to excitation light emitted from one or more light sources having a spectral wavelength from about 365 nm to about 450 nm and/or from about 630 nm to about 660 nm. In one particular embodiment, the plant or plant part is subjected to excitation light emitted from one or more light sources having a spectral wavelength of about 365 nm, 405 nm, 430 nm, 450 nm, 630 nm, 645 nm, and/or 660 nm, which is absorbed by the chlorophyll photopigment and emitted as a lower energy spectral wavelength of greater than about 690 nm. The fluorescence emission is then transmitted through a suitable emission filter (e.g., long pass light filter transmitting light greater than about 690 nm) and detected by an imaging camera.

In general, an increase in fluorescence intensity indicates increased stress due to, e.g., the presence of a pathogen. Additionally, human pathogens appear to spread across the mesophyllic leaf so that the stress is distributed across the foliar structure. The fluorescence emission intensity measurements can be further used to calculate the photosynthetic rate change for a specific plant variety. The photosynthetic rate for a particular plant in this case may be expressed as a percent change compared to control plants of the same variety and under the same controlled environmental conditions. To generate the fluorescence intensity control profile, fluorescence emission intensity of the same spectral wavelength as the testing group is measured for 3 or 4 plants that have not been infected by pathogens. The average fluorescence emission intensity for the control plants is $Emission_{(ctrl)}$. Thus, the change in fluorescence emission intensity for a given spectra and for a particular plant variety can be calculated according to Equation 3, where Ci is the coefficient related to a particular plant species, which is cross calibrated against a known value (e.g., from SPAD 502 meter or other systems) or established from a panel of control plants.

$$Emission\Delta = Ci\left(\frac{Emission_{(meas)} - Emission_{(ctrl)}}{Emission_{(ctrl)}}\right) \quad [\text{Equation 3}]$$

The photosynthetic rate can be calculated by normalizing the change in emission by the average percent change in intensity of light reflected from the plant or plant part at spectral wavelengths of about 645 nm and/or 660 nm according to Equation 4.

$$\Delta Rate = PCi \times \left(\frac{Reflectance_{(meas)} - Reflectance_{(ctrl)}}{Reflectance_{(ctrl)}}\right) \times Emission\Delta \quad [\text{Equation 4}]$$

In Equation 4, PCi is a constant derived for each type of plant reflectance and the control conditions for the plant. Where $Reflectance_{(meas)}$ is the measure of the intensity of reflected light of the plant or plant part when subjected to light at spectral wavelengths of about 645 nm and/or 660 nm and where and Reflectance (ctrl) is the average reflective intensity measurement of control plants.

Therefore, the photosynthetic rate of a plant or plant part can be determined by first measuring the reflective intensity and fluorescence emission intensity and then calculating the percent change in photosynthetic rate using Equations 3 and 4. A decrease in photosynthetic rate compared to the benchmark control intensity indicates that the plant has been exposed to a stress, such as a pathogen infection. As with the DUVF and MSI reflective intensity data discussed above, specific MSI fluorescence emission intensity profiles for specific plant varieties under specific controlled environmental conditions can be generated to allow the use of the present method for rapid detection of pathogen infection and the plant's corresponding stress response. In fact, the present methods can be used to generate a MSI intensity profile database for any particular plant variety that includes reference reflectance and emissions intensity data for uninfected as well as plants infected with any number and concentration of pathogens. As such, the practitioner need only select the intensity profiles for monitoring and surveillance of the plant of interest and use these profiles with the methods described herein for rapid and real time detection of pathogen infection as well as the determination of the concentration of that pathogen. Therefore, the practitioner can take swift action to remediate the infection and prevent decreased crop yields and/or pathogen contamination.

Figure 2:
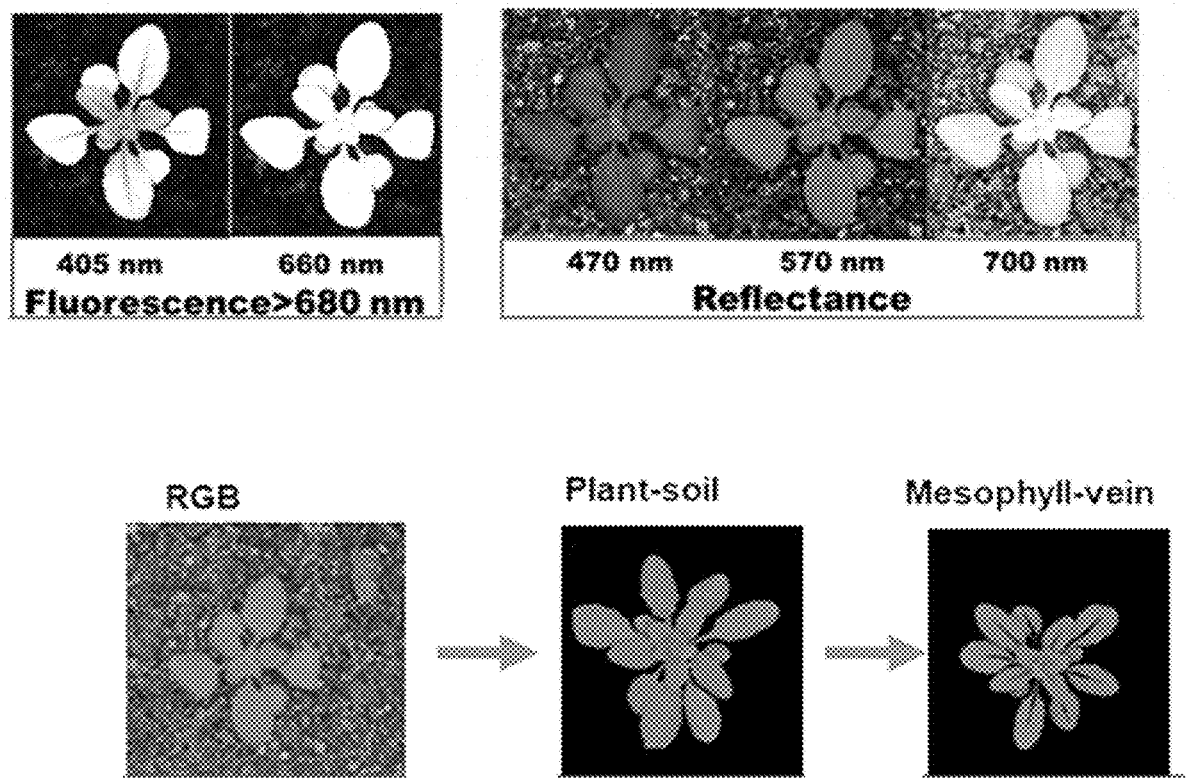
FIG. 2 are exemplary digitally captured images of *Arabidopsis* using fluorescence and reflectance imaging. The top left images are fluorescence images of the *Arabidopsis* produced by excitation light wavelengths of 405 nm and 660 nm. The top right images are reflectance images produced by light wavelengths of 470 nm, 570 nm, and 700 nm. The bottom images, from left to right, are the bright field image of the plant in soil, the plant image segmented from the soil, and the plant mesophyll segmented from the plant's vascular system.

Thus, using a combination of DUVF and MSI with both light reflection intensity and fluorescence, the presence of pathogen infection can be detected and measured along with the plant's stress response to the pathogen infection over time. In preferred embodiments, the pathogen is a human pathogen. While the DUVF and MSI intensity measurements can be done in any order, it is preferable to perform the MSI reflection measurements followed by the MSI fluorescence emission measurements followed by the DUVF measurements. FIG. 2 shows exemplary MSI reflection intensity and fluorescence emission intensity imaging of *Arabidopsis*.

DUVF-MSI Biophotonic Analyzer Device

While the methods of the instant invention can be carried out using tools available in the art, e.g., VideometerLab 4 MSI (Videometer A/S, Copenhagen, Denmark) for MSI and the TraC DUVF (Photon Systems, Inc., California, United States) for DUVF, the present invention also includes a novel and innovative biophotonic analyzer device that, for the first time, utilizes both DUVF and MSI in a single device. Indeed, existing limitations at the time of the invention, including the lack of DUV LED with sufficient power output, prohibited development of a device combining DUVF and MSI with a single imager. Thus, the biophotonic analyzer device disclosed herein is an innovative tool that can be used for performing both the DUVF and MSI pathogen and stress-response detection methods discussed above in an efficient, rapid, and cost-effective manner. Moreover, the design of the device enables its incorporation into line conveyor systems for use in greenhouses or vertical farms or for mounting to low flying drones for surveillance of outdoor crop fields.

The biophotonic analyzer device will generally include a light distributing element, a light detection system, a control system, and a calculating module. The light distributing element includes an integrating cavity, which is preferably rounded or spherical in shape, with an inner surface forming a hollow interior. The inner surface comprises a dull light-reflective coating, such as a sintered polytetrafluoroethylene polymer coating (SPECTRALON®, Labsphere, Inc., New Hampshire, United States) or a white diffusing paint based on barium sulphate. Thus, light emitted into the interior of the integrating cavity will uniformly illuminate the interior. The integrating cavity will further include a top opening, or imaging port, and a bottom opening, or object port. Preferably, both the imaging port and the object port are at opposite poles of the integrating cavity and substantially on the same optical axis and in substantial optical alignment. The integrating cavity will also include a DUV light source and one or more additional light sources, each of which is configured to emit light having a different spectral wavelength, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more additional light sources for MSI analysis. Alternatively, the integrating cavity may include a DUV light source and one additional source of light combined with a plurality of excitation light filters (e.g., a filter wheel) wherein each light filter is configured to transmit light of a particular spectral wavelength for MSI analysis.

The DUV light source of the present device will emit light having a spectral wavelength of about 200 nm to about 280 nm (preferably, about 250 nm to about 280 nm), and the one or more additional light sources will emit light having spectral wavelengths selected from the range of about 350 nm to about 1,000 nm. In a particular embodiment, the biophotonic analyzer device includes a DUV light source and 2-20 additional light sources for MSI analysis. For instance, the device may include light sources emitting light with spectral wavelengths of about 200 nm to about 280 nm (preferably between about 250 nm and about 280 nm) for DUV and a plurality of additional light sources for MSI that emit light with spectral wavelengths selected from about 360 nm to about 370 nm, 400 nm to about 410 nm, 430 nm to about 440 nm, 445 nm to about 455 nm, 465 nm to about 475 nm, 480 nm to about 505 nm, 520 nm to about 530 nm, 545 nm to about 555 nm, 565 nm to about 575 nm, 585 nm to about 600 nm, 625 nm to about 635 nm, 640 nm to about 650 nm, 655 nm to about 665 nm, 685 nm to about 695 nm, 765 nm to about 775 nm, 845 nm to about 855 nm, about 865 to about 875, about 935 nm to about 945 nm, or about 965 nm to about 975 nm. In one particular exemplary embodiment, the biophotonic analyzer device includes lights sources that emit light having the following spectral wavelengths: 265 nm (DUV), 365 nm, 405 nm, 430 nm, 450 nm, 470 nm, 490 nm, 525 nm, 550 nm, 570 nm, 590 nm, 630 nm, 645 nm, 660 nm, 690 nm, 770 nm, 850 nm, 870 nm, 940 nm, and 970 nm.

In a preferred embodiment, the integrating cavity includes a plurality of LED lights mounted circumferentially and equatorially around the inner surface of the integrating cavity and configured to emit light of the desired spectral wavelengths. In each case, the light sources will be operated via a user-programmable control system programmed to active the light sources in the desired sequence and for the desired time. The integrating cavity will preferably be rounded or spherical in shape. In some embodiments, the integrating cavity will have a diameter of between about 3 inches to about 12 inches, e.g., 3 inches, 4 inches, 5 inches, 6 inches, 7 inches, 8 inches, 9 inches, 10 inches, 11 inches, or 12 inches; preferably, between about 4 inches to about 8 inches. The biophotonic analyzer device can be configured for hand-held operation or motorized/robotic mounting.

The light detection system of the biophotonic analyzer may include a light intensity detector, such as a photodiode or digital imaging camera in optical communication with the view port, or aperture. In a preferred embodiment, the light intensity detector is a digital imaging camera. In some embodiments, it may be desired to mount the biophotonic analyzer to the ceiling, the bottom of a drone, or a conveyor system. In such embodiments, the biophotonic analyzer is designed such that the light intensity detector is off center relative to the view port, wherein a mirror element is in optical alignment with the view port and configured to divert light emitted from the interior of the integrating cavity to the digital imaging camera.

The biophotonic analyzer device may also include one or more optical or emission filters for fluorescence imaging. The types of suitable emission filters are discussed above in detail. In some embodiments, the biophotonic analyzer device includes a light filter component containing a plurality of emission filters and configured to switch between the different emission filters via the control system. Each of the emission filters will be adapted for transmission of a particular spectral wavelength or range of spectral wavelengths ranging from 260 nm to 1,000 nm. The emission filters can be short pass, narrow band pass, or long pass filters, each of which are readily available in the art, and it is well within the purview of the skilled artisan to select emission filters suitable for transmitting the desired light to the imaging camera. For instance, narrow band pass filters for transmitting fluorescence emission of 320 nm, 340 nm, 360 nm and/or 380 nm can be used for detecting DUVF, whereas long pass filters for transmitting fluorescence emission great than 690 nm can be used for detecting chlorophyll A/B fluorescence.

In some embodiments, the biophotonic analyzer will be calibrated prior to use. For instance, a non-limiting exemplary biophotonic analyzer device may include an industrial grey scale camera with a sensitivity range of about 350-1000 nm. The consistency of each of the LEDs of the device may be tested by comparing their respective emission spectra to commercial LED lights selected within the same target wavelength and bandwidth (e.g., 570+/−2 nm). The LED irradiative flux control (duration and power level) are tuned across the visible spectrum to be proportional to the solar spectrum, on which the plants rely to conduct photosynthesis, and to insure imaging consistency. The camera controls shutter speed is also controlled for imaging sensitivity.

The LEDs are fired in sequence from UV to visible to near infrared in order of increasing wavelength. The LED pulse energy and duration (typically between about 100-300 milliseconds per LED wavelength) allow for the total irradiative flux (watts/cm$^2$) to be consistent relative to solar calibration. The camera sensitivity is set using three targets to insure spectral and spatial consistency. The integrating sphere is used to insure uniform object lighting at the aperture opposite the camera. The targets for the camera calibration include a white target surface to calibrate camera and LEDs, such as a disk of a diffuse white coating (Spectralon®) to set camera spectral sensitivity; an optical grey target to optimize sensitivity at each wavelength from most to least intense and a spatial calibration target to calibrate x and y dimensions. Once the camera and LED settings are established, the MSI light arrangement will be calibrated for a given plant type as a control to establish a calibration image model for the control plant species. This allows contrast MSI models to be developed for stressed and genomically different plants of the same species. For instance, a suitable control plant for a given species preferably is a well-known variety, e.g. wild type *Arabidopsis* Columbian. The MSI light arrangement is activated to create LED lighting parameters for a given optimal spectral response for the control plant. This then is used to compare to other plants of the same variety for detecting spectral and shape changes due to stress, which in turn creates a loss of photopigment (e.g. Chlorophyll), as well as light reflection intensity and/or reduced vascular area. These differences are used to create models of spectral and spatial content against control plants (standard plant varieties).

These control measurements establish camera and LED parameters for MSI assays and can be programmed into a menu that is selectable by the user to enable the user to perform rapid sequential measurements of plants and calibrate the measurements for each wavelength for reflection and fluorescence incorporating the measurement sensitivity determined by the LED power and duration.

Figure 3A:
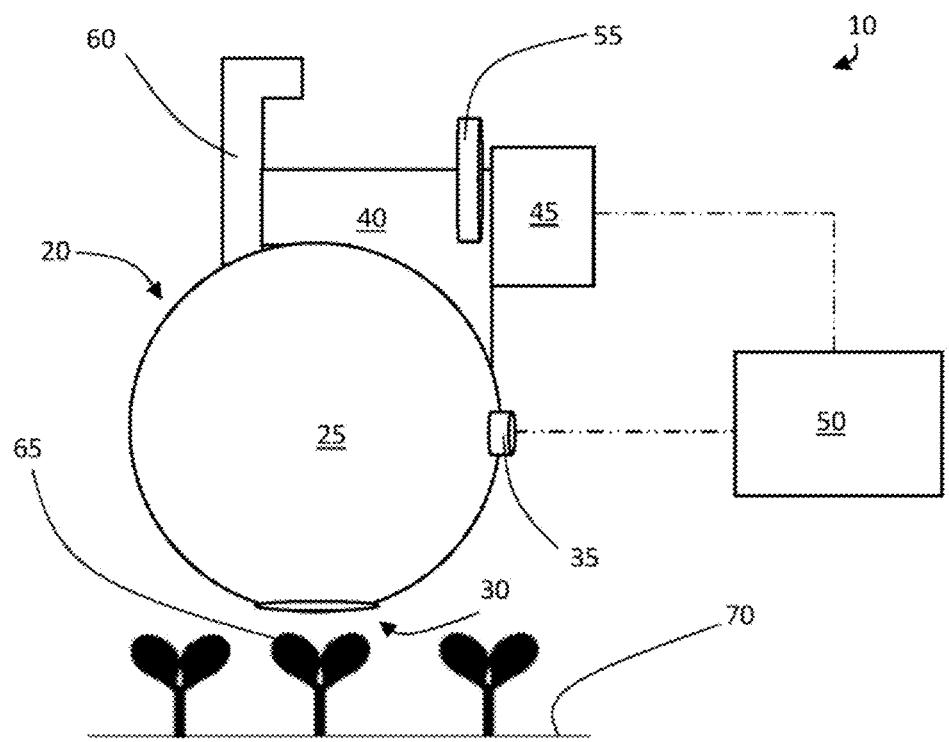
FIG. 3A is a diagram of an embodiment of the biophotonic analyzer device. The broken line represents a signal sent by either an electrical connection and/or wireless networking technology.
Figure 3B:
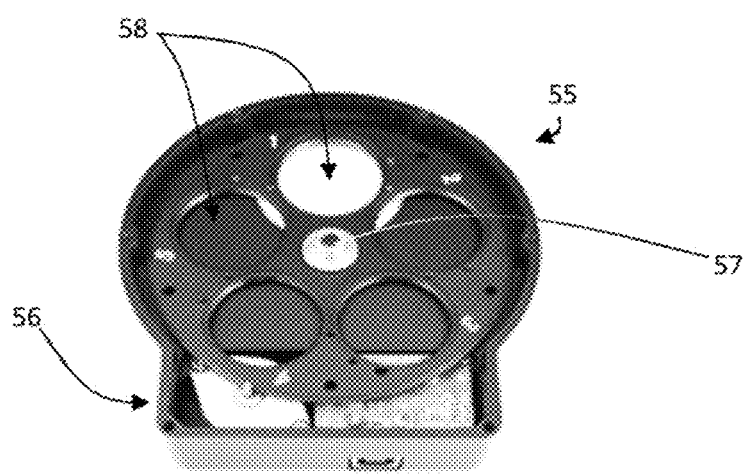
FIG. 3B is a picture of an exemplary filter wheel suitable for use with the biophotonic analyzer device of the present invention.

An exemplary biophotonic analyzer device is shown in FIG. 3A. As shown in FIG. 3A, the biophotonic analyzer device 10 includes an integrating cavity 20 with a housing 25. The object port 30 is also shown. In this depiction, the imaging port 90 is not visible (see FIG. 4). The device includes a light detection system housing 40 disposed on top surface of the housing 25 of the integrating cavity 20 and is connected to an imaging camera 45. A power source (broken line) for operating the light sources and the imaging camera 45 is connected to control element 50 (e.g., programmable CPU element). An attachment element 60 is configured for attaching the biophotonic analyzer device 10 to a conveyor system or other object (not shown). For fluorescence detection, a filter wheel 55 is provided (see also FIG. 3B). The filter wheel 55 will be mechanically coupled to an electronic element 56 via rotor 57 that is configured to rotate the filter wheel 55. The filter wheel 55 will include a plurality of filter holder elements 58 in which the appropriate fluorescence emission filter can be inserted. In addition, at least one filter holder element 58 can be left empty for reflection imaging.

The filter wheel 55 is configured to rotate about the rotor 57 in response to electrical signals sent from the control element 50. The rotation of the filter wheel 55 switches between the various fluorescence emission filters or no emission filter.

The object of interest, i.e., the plant 65, is positioned beneath the object port 30. The control element 50 sends signals to the light sources around the interior of the integrating cavity 20 via connection 35, which emit light from the object port 30 to the plant 65. The imaging camera 45 captures the image and relays the captured image to the control element 50, which includes or is in communication with a calculating module (e.g., via wireless networking). The calculating module includes a software program for differentiating the plant 65 image and, in particular the surface of the plant leaves, from the background 70 (e.g., soil). The calculating module software program will also be configured for differentiating the different plant tissues (e.g., mesophylls, vasculature, and seeds) (see FIG. 2). The light intensity data can then be sent to a CPU for further analysis or storage.

Figure 4:
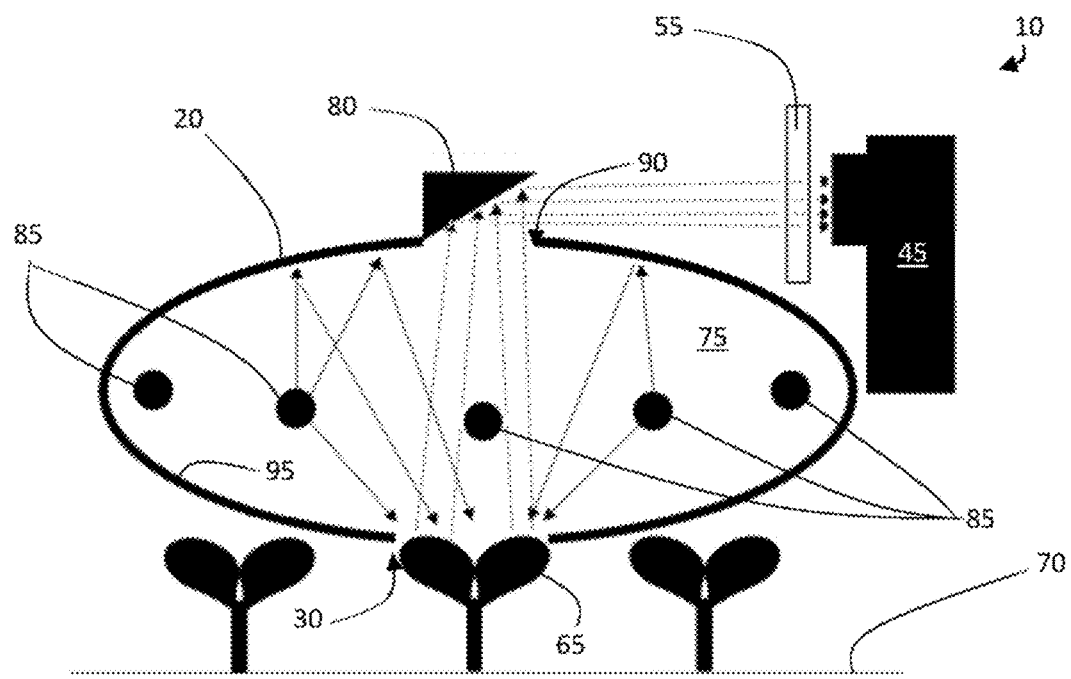
FIG. 4. is a cross-section diagram of the biophotonic analyzer device. The solid arrows represent light emitted from the LED light sources, whereas the dotted arrows represent light reflected by or emitted from the plant.

FIG. 4 is a cross-section diagram showing the interior 75 of the integrating cavity 20. The object port 30 and the imaging port 90 are shown. As light is emitted from one of the light sources 85 mounted circumferentially around the inner surface 95 of the integrating cavity 20, the emitted light (represented by solid arrows) is reflected or emitted from the plant 65 (represented by dotted arrows). A mirror element 80 is in optical alignment with both the imaging port 90 and the object port 80 to direct the reflected or emitted light to the imaging camera 45. When fluorescence imaging is desired, the filter wheel 55 switches to the appropriate light emission filter via the control element 50.

In operation, the user will select the specific lights sources necessary for the desired DUVF and/or MSI analysis via the control element. For instance, in some embodiments, the control element will be configured for the selection of one or more preset analysis programs. In other embodiments, the user will be able to customize the activation and timing of the particular light sources and, if necessary, the emission filters. The user may interface with the control element and the calculating module via a computer processing unit (e.g., laptop or mobile device).

For instance, in one embodiment, the biophotonic analyzer device includes one light source for DUV (265 nm) and 19 additional light sources for MSI (365 nm, 405 nm, 430 nm, 450 nm, 470 nm, 490 nm, 525 nm, 550 nm, 570 nm, 590 nm, 630 nm, 645 nm, 660 nm, 690 nm, 770 nm, 850 nm, 870 nm, 940 nm, and 970 nm). In this embodiment, MSI reflection intensity measurements are performed first. The user will select a program pre-set for MSI reflection measurements followed by MSI fluorescence emission and DUVF measurements via the control element 50 or via a separate device (e.g., laptop or mobile device) configured to communicate with the control element 50 (e.g., wireless networking). The control element 50 will send a signal to each of the 19 light sources 85 (for simplicity, only four representative light sources are shown) and pulse each light source 85 for about 0.1 to about 0.3 seconds in succession. As the light is strobed from the 365 nm spectral wavelength to the 970 nm spectral wavelength, each spectral wavelength of light is emitted from the object port 30 and is reflected off of the plant 65. The reflected light is directed back through the object port 30, through the imaging port 90, and directed by the mirror 80 to the imaging camera 45. For these reflective intensity measurements, there is no filter selected in the filter wheel 55.

The imaging camber 45 captures the image with reflected light intensity for each spectral wavelengths and sends the imaging data to the control element 50 and calculating module where the imaging data is calibrated and normalized for background. The reflected light intensity data is stored and compared to the stored MSI reflection intensity profiles to calculate the change in intensity compared to a normal plant of the same variety and under the same controlled environmental conditions.

The control element 50 then sends a signal to one or more light sources corresponding to emitted light in the spectral wavelengths of 365 nm, 405 nm, 430 nm, 450 nm, 630 nm, 645 nm, and/or 660 nm for chlorophyll AB emission measurements. At the same time, the control element will send a signal to the filter wheel 55 to switch to the long pass filter for transmitting wavelengths greater than 690 nm. The control element will pulse each of the appropriate light sources for about 0.5 to about 2 seconds in succession. As the light is emitted from each of the light sources, it is emitted through the object port 30 and is absorbed into the surface of the leaves of plant 65. The fluorescence emission from the plant 65 is sent back through the object port 30, through the imaging port 90, and is directed by the mirror 80 and through the long pass filter of the filter wheel 55 to the imaging camera 45. The imaging camber 45 captures the image with fluorescence emission intensity for each of the excitation wavelengths and sends the imaging data to the control element 50 where the imaging data is calibrated and normalized for background. The fluorescence emission intensity data is stored and compared to the appropriate MSI emission intensity profiles to calculate the change in intensity. Further, the control element calculates the change in photosynthesis rate using the data from both the reflection analysis and the emission analysis.

Finally, the control element 50 sends a signal to the DUV light source, which emits DUV light having a spectral wavelength of 265 nm. At the same time, the control element sends a signal to the filter wheel 55 to select the first DUVF emission filter (narrow band pass filter for transmission of 320 nm). The DUV light exits the object port 30 and is absorbed by the leaf surface of plant 65. The fluorescence emitted from the plant 65 is sent back through the object port 30 and is detected by the imaging camera 45, which relays the image and emission intensity data to the control element 50 as described above. The control element 50 then sends a signal to the filter wheel 55 to select the next DUVF emission filter (narrow band pass filter for transmission of 340 nm). This process repeats for each of the 360 nm and the 380 nm narrow band filters of the filter wheel 55. The imaging camera 45 sends the imaging data to the control element 50. The control element 50 or another CPU configured to communicate with a retrieve the light intensity data from the control element 50, is then used to compare the normalized and calibrated fluorescence intensity data to the DUVF intensity profiles for the same plant variety under the same controlled environmental conditions. As a result, the user obtains real time data that indicates whether the plant 65 was infected with a pathogen and, if so, the identity of the pathogen and level of infection.

In some embodiments, the biophotonic analyzer device can be used as a handheld device. In other embodiments, the biophotonic analyzer device can be attached to the under carriage of a drone and flown slowly over rows of crops to take DUVF and MSI measurements. The control element may include wireless capability to send data to a remote CPU element for making the calculations or may include a calculating module for calibration and normalization of the light intensity data, which can then be sent to a CPU element (e.g., laptop) for further analysis. In other embodiments, one or more biophotonic analyzer devices can be hung from a conveyor element for use in a vertical farm or greenhouse. In this embodiment, the devices are moved along rows of plants for taking DUVF and MSI measurements as described herein.

The following examples are provided to describe the invention in greater detail. They are intended to illustrate, not to limit, the invention.

EXAMPLES

Figure 5:
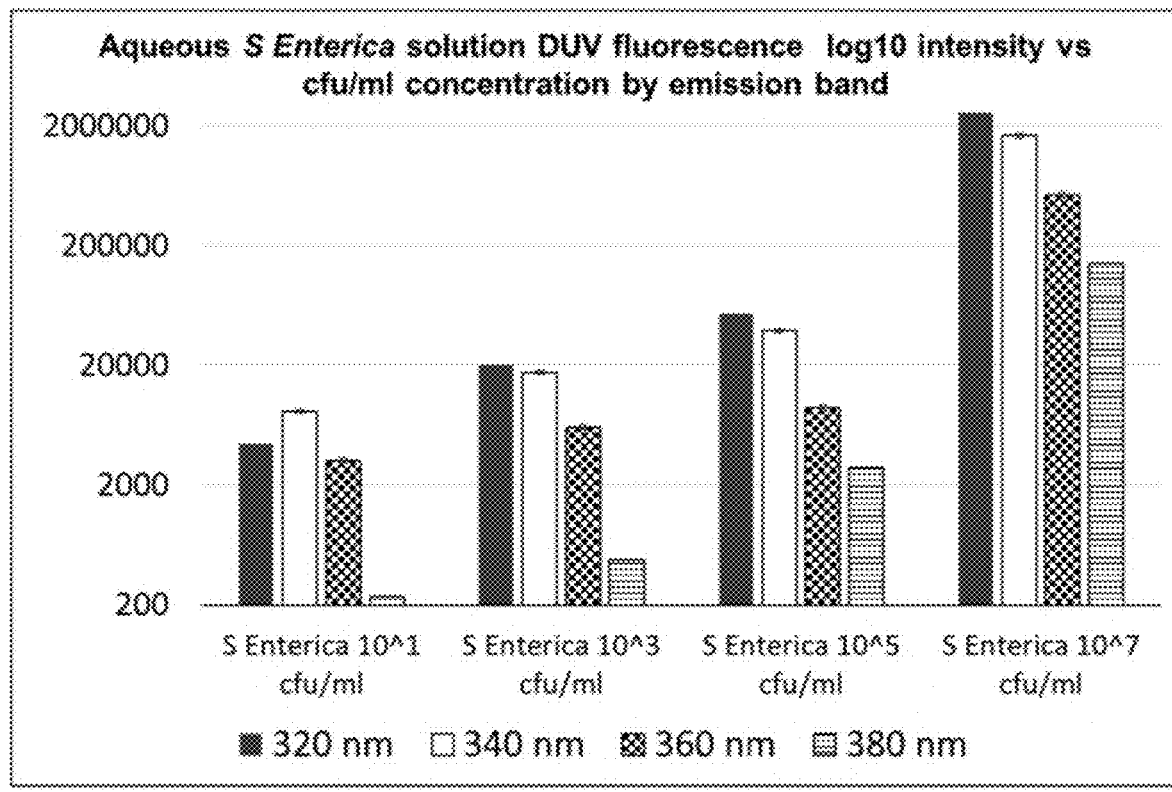
FIG. 5 is a graph showing the log 10 DUVF intensity for *S. enterica* serial dilutions of 10 cfu/ml, $10^3$ cfu/ml, $10^5$ cfu/ml, and $10^7$ cfu/ml. The specific dilutions are indicted on the X-axis. For each dilution, the bars represent the DUVF emission intensity for the 320 nm, 340 nm, 360 nm, and 380 nm wavelengths (from left to right). The y-axis represents the DUVF emission intensity.

Example 1. DUVF Detection of *S. enterica*, UD 1022, and DC 3000 in Serial Dilutions To test the capability of the DUVF detection method to differentially measure increasing concentrations of pathogen, serial dilutions of *S. enterica* were prepared at 10 cfu/ml, 100 cfu/ml, $10^5$ cfu/ml, and $10^7$ cfu/ml. Liquid cultures of *S. enterica* were grown and diluted in water. The pathogen dilution samples were loaded into 3 cc fused silica cuvettes that were precalibrated with water. DUVF measurements were conducted using a TraC® DUVF (Photon Systems, Inc., California, United States) configured to emit DUV light at 270 nm and detect emission intensities at 320 nm, 340 nm, 360 nm, and 380 nm. The log 10 emission intensity for each dilution is shown in FIG. 5. The R-Sqrd value for each band intensity versus concentration was less than 0.98. The 340 nm and 360 nm emission intensity bands were most highly correlated to cfu/ml.

Figure 6:
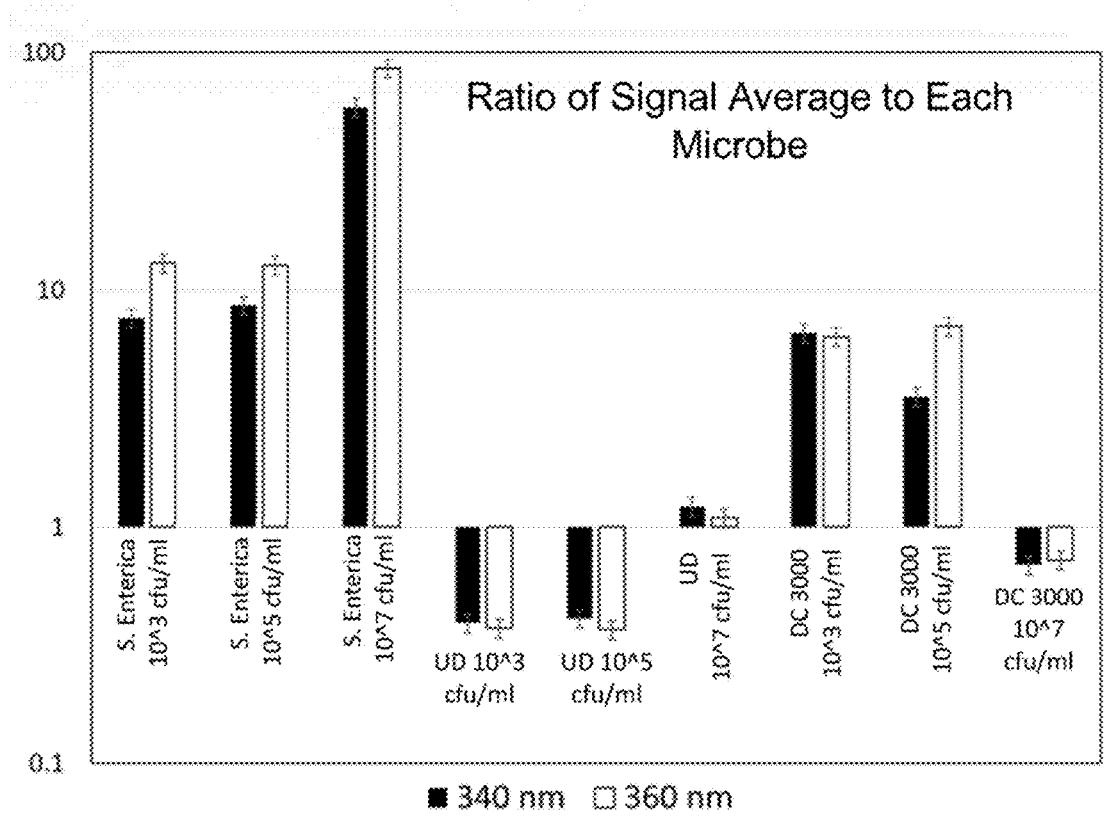
FIG. 6 is a graph showing the ratio of signal average to each dilution of *S. enterica, B. subtilis* UD1022, and *P. syringae* DC3000 pathogen. The identity of the pathogen and the specific dilutions for each are indicted on the X-axis. For each dilution, the bars represent the DUVF intensity for the 340 nm wavelength (left bar) and 360 nm wavelength (right bar). The y-axis represents the ratio of signal average.
Figure 7:
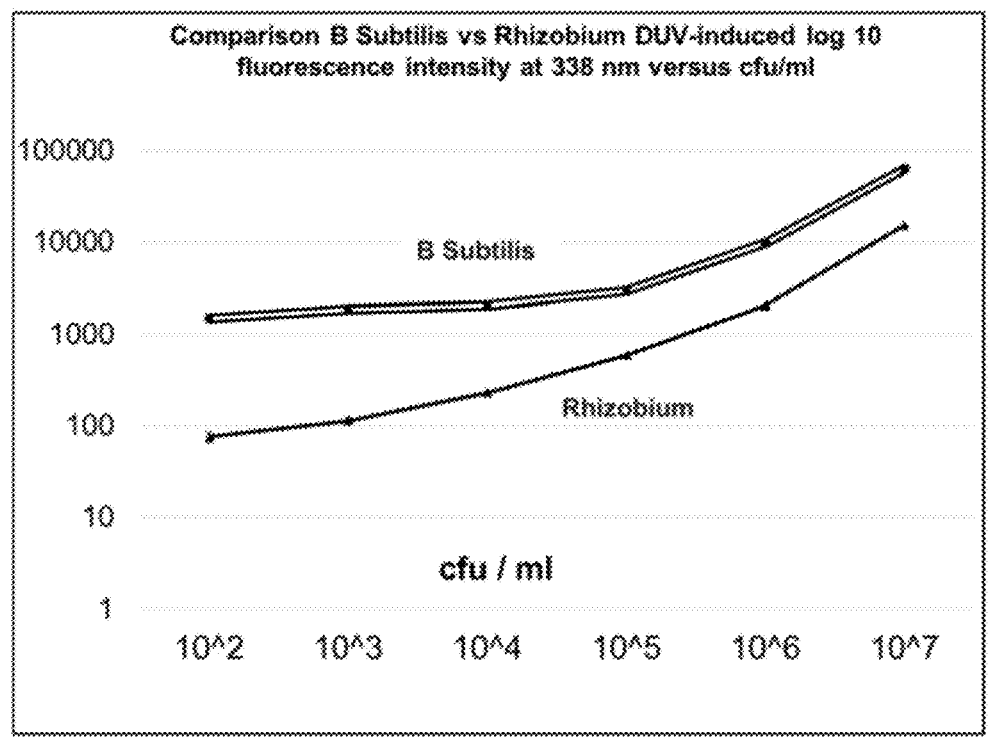
FIG. 7 is a graph showing the comparison of fluorescence intensity from *B. subtilis* UD 1022 (top line) compared to *S. meliloti* (bottom line). The x-axis represents the concentration of pathogen, and the y-axis represents fluorescence intensity.

The DUVF measurements were carried out on serial dilutions of *P. syringae* DC3000, *B. subtilis* UD 1022, and *Sinorhizobium meliloti*. FIG. 6 compares the ratio of fluorescence intensities to mean intensity values for *S. enterica*, *P. syringae* DC3000, and *B. subtilis* UD 1022. The DUVF intensity ratios showed a clear differentiation between the pathogen species as the emission intensity differences at 340 nm and 360 nm were typically factors of at least 2- to 4-fold. *B. subtilis* UD 1022 and *S. meliloti* serial dilutions at 100 cfu/ml, $10^3$ cfu/ml, $10^4$ cfu/ml, $10^5$ cfu/ml, $10^6$ cfu/ml, and $10^7$ cfu/ml were exposed to DUV at 248 nm, and the emission intensities at about 340 nm were detected. As shown in FIG. 7, the DUVF log 10 emission intensity at 340 nm is differentiated between the two pathogens across five orders of magnitude of concentrations.

Example 2. DUVF Detection of Pathogens on Black Seeded Simpson Lettuce Leaves

To evaluate the efficacy of the DUVF method to detect pathogens on plants, Black Seeded Simpson lettuce plants at three weeks of age and under controlled environmental conditions were dosed with water (control) or either *S. enterica*, *L. innocua*, *B. subtilis* UD1022, or *P. syringae* DC3000 pathogens at concentrations ranging from 10 cfu/ml to $10^7$ cfu/ml. DUVF measurements were obtained from 3 to 4 points on the foliar surfaces of each plant using a TraC® DUVF (Photon Systems, Inc., California, United States). DUFV measurements were taken just prior to dosing and at regular post-dosing intervals (<10 minutes, 3 hours, 6 hours, 24 hours, 72 hours, and 120 hours).

Figure 8:
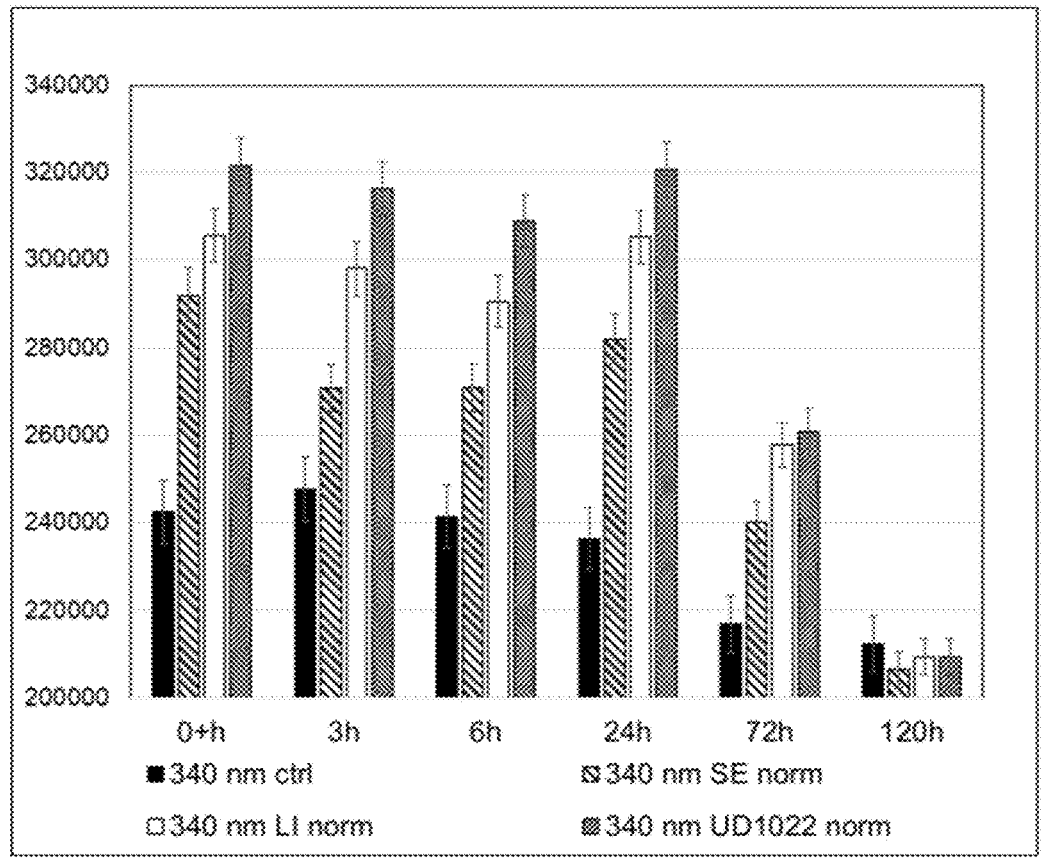
FIG. 8 is a graph showing the foliar fluorescence intensity at the 340 nm emission band over time for Black Seeded Simpson lettuce inoculated with $10^3$ cfu/ml of a pathogen. The x-axis represents hours after dosing, and the y-axis represents fluorescence intensity. For each time point, the fluorescence intensity for control plants (left bar) is compared to plants dosed with *S. enterica* (second bar from left), *L. innocua* (second bar from right), and *B. subtilis* UD1022 (right bar).

For each measurement, the plants were exposed to DUV light (265 nm), and emission intensity was detected at 340 nm, 360, and 380 nm. The DUVF detection method allowed the differential detection of pathogen-infected plants compared to control plants, especially when comparing emission band ratios 340 nm/360 nm and 360 nm/380 nm. FIG. 8 shows a DUVF log 10 340 nm emission plot from control plants as compared to plants dosed with $10^3$ cfu/ml of the different pathogens. Similar results were obtained for spinach plants (data not shown). The results showed that DUVF method of the present invention is capable of differential detection of the pathogens for up to 72 hours post-dosing, even at low concentrations of pathogens.

Example 3. MSI Analysis of Stress-Response in Lettuce and Spinach Plants

To evaluate the efficacy of the MSI method to detect the stress response in plants infected with pathogens, the Black Seeded Simpson lettuce plants from Example 2 were further subjected to MSI analysis at each of the time points discussed above. For this analysis, the VideometerLab® 4 MSI with a digital camera (Videometer A/S, Copenhagen, Denmark) was used.

Figure 9:
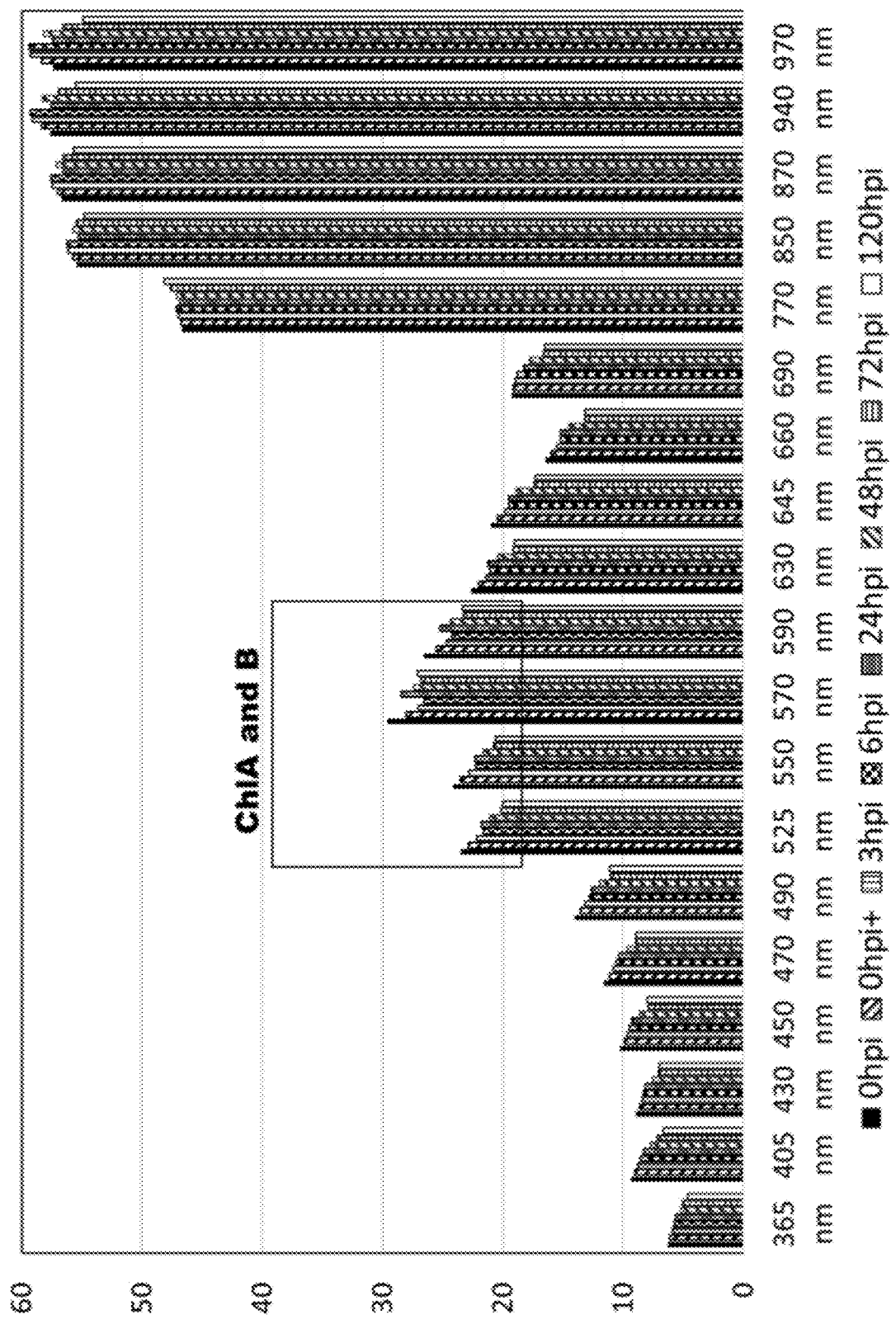
FIG. 9 is a graph showing the MSI foliar reflection intensity for Black Seeded Simpson well-watered (control). The x-axis indicates the spectral wavelength for each emitted light (nm). The bars for each spectral wavelength represent the reflection intensity over time. From left to right, the timepoints are 0 hpi, 0+hpi, 3 hpi, 6 hpi, 24 hpi, 48 hpi, 72, hpi, and 120 hpi. "0 hpi" references MSI measurements taken prior to dosing and "0+hpi" represents MSI measurements taken less than 10 minutes post-infection. The y-axis represents reflection intensity.
Figure 10:
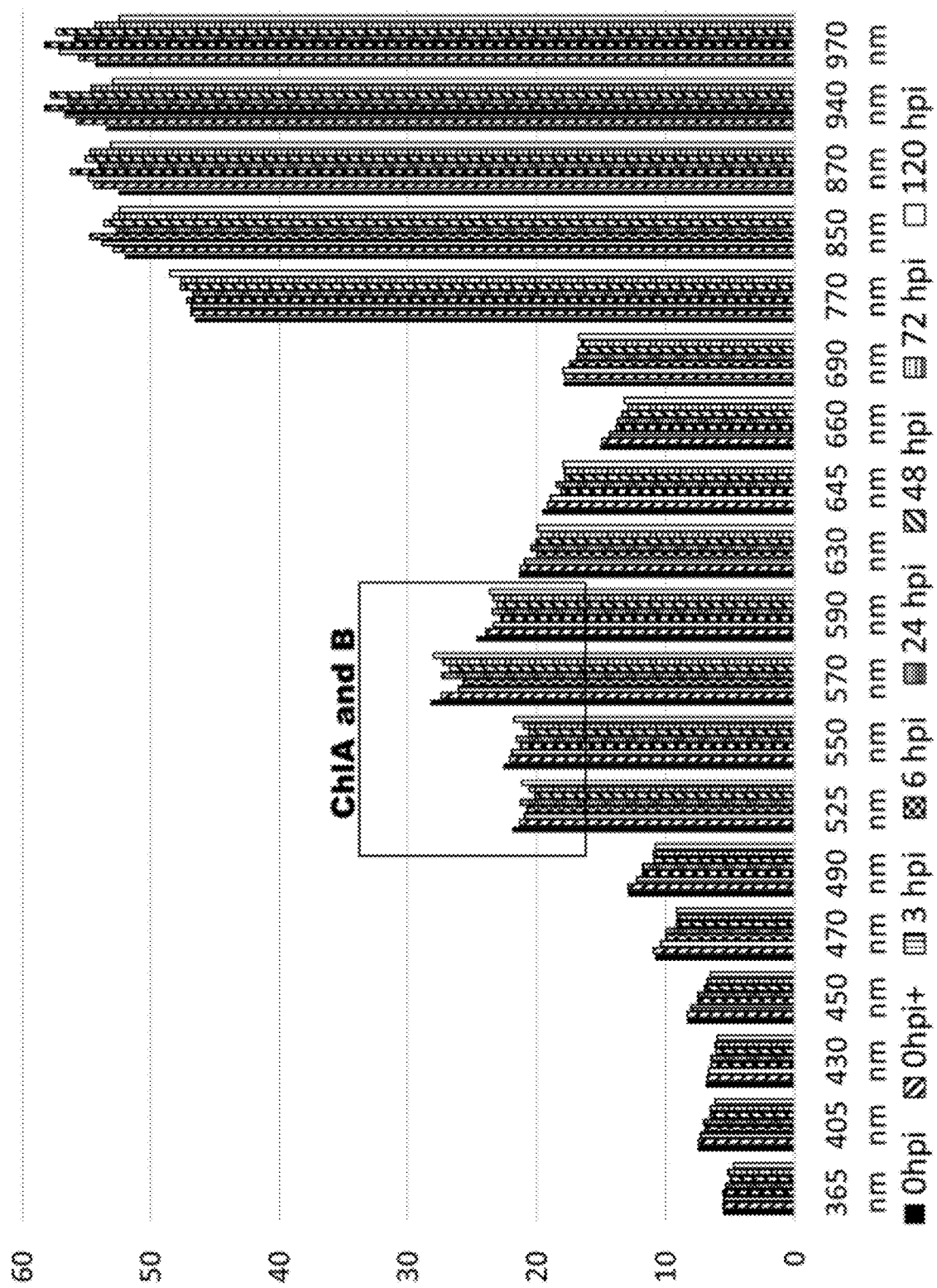
FIG. 10 is a graph showing the MSI foliar reflection intensity for Black Seeded Simpson dosed with $10^3$ cfu/ml *L. innocua*. The x-axis indicates the spectral wavelength for each emitted light (nm). The bars for each spectral wavelength represent the reflection intensity over time. From left to right, the timepoints are 0 hpi, 0+hpi, 3 hpi, 6 hpi, 24 hpi, 48 hpi, 72, hpi, and 120 hpi. "0 hpi" references MSI measurements taken prior to dosing and "0+hpi" represents less than 10 minutes post-infection. The y-axis represents reflection intensity.
Figure 11:
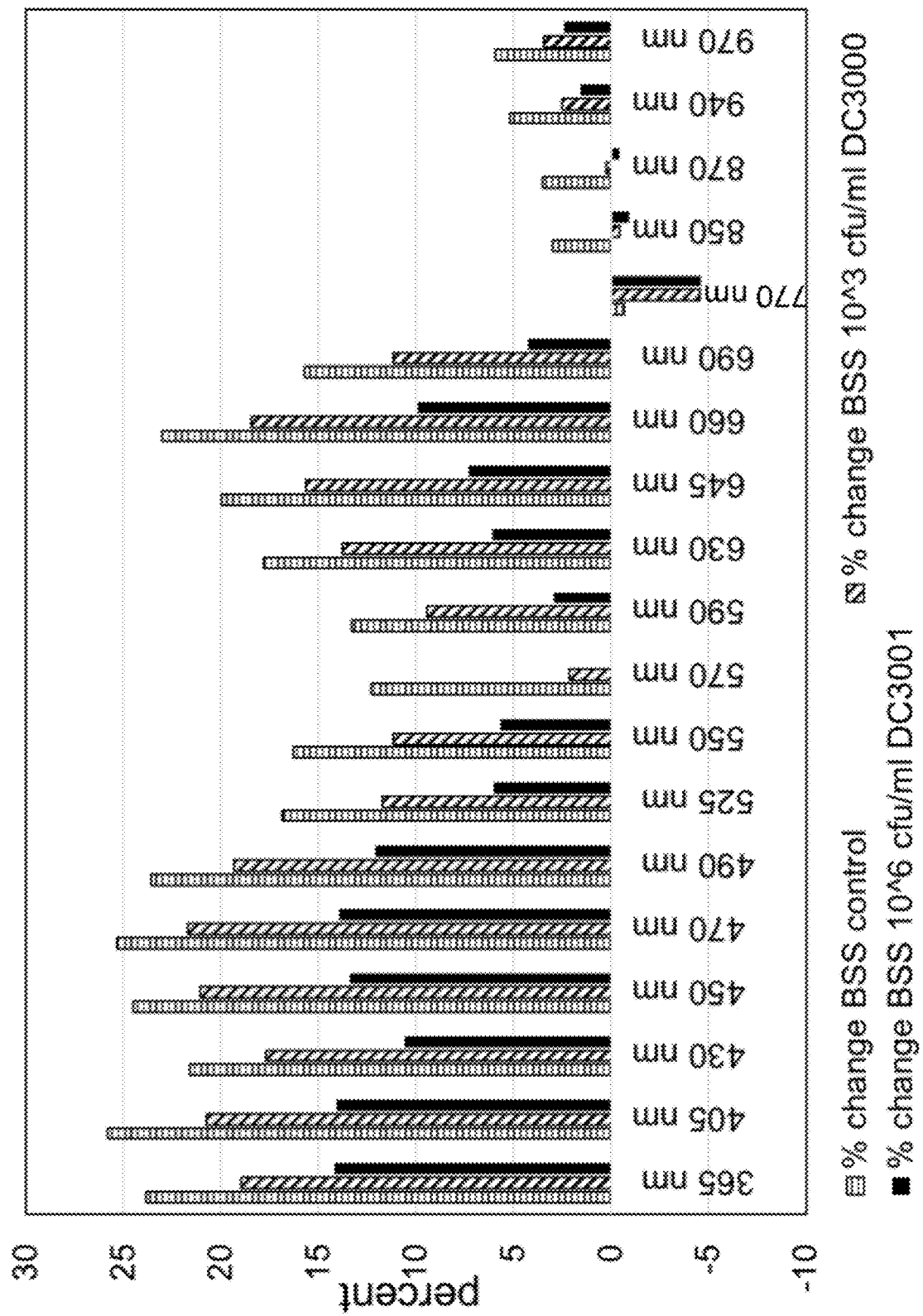
FIG. 11 is a comparison of the percent increase of plant absorption by wavelength in Black Seeded Simpson lettuce control plants versus plants inoculated with *P. syringae* DC3000 at $10^3$ cfu/ml or $10^6$ cfu/ml. The values represent the percent change from 0 hours post-infection to 120 hours post-infection. The x-axis indicates the spectral wavelength for each emitted light (nm). The bars for each spectral wavelength represent the percent change in absorption for the control plant (left bar), the plant inoculated with $10^3$ cfu/ml *P. syringae* DC3000 (middle bar), and the plant inoculated with $10^6$ cfu/ml *P. syringae* DC3000 (right bar).

MSI reflection intensity was first carried out by exposing the foliar surfaces of each plant to light of different spectral wavelengths ranging from 365 nm to 970 nm. The intensity of reflected light from each plant for each wavelength was recorded using the digital camera of the VideometerLab® 4 MSI. The image information from the foliar surfaces was segmented from the soil and other physical plant structures and calibrated to minimize background noise. FIG. 9 shows the MSI reflection spectra for the control Black Seeded Simpson lettuce plant. (well-watered). As shown in FIG. 9, the reflection intensities for the different photopigments decrease over time indicating up to 18% photopigment concentration increase. In addition, the water concentration is increased by about 5% as indicated by the 940 nm reflection intensity. The reflection intensities at 525 nm to 590 nm for chlorophyll A and B are indicated by the box. In comparison, Black Seeded Simpson lettuce plants dosed with pathogen showed an increase in reflection intensity indicating a decrease in photopigment concentration over time. For instance, FIG. 10 shows the reflection intensity profile for a Black Seeded Simpson lettuce plant dosed with $10^3$ cfu/ml *L. innocua*. As can be seen in the graph, the chlorophyll A and B concentration decreased by up to 16% over time (see box). FIG. 11 shows the percentage change from 0 hours post dosing to 120 hours post dosing for untreated control plants versus plants dosed with $10^3$ cfu/ml or $10^6$ cfu/ml *P. syringae* DC3000. As can be seen in FIG. 11, increasing concentration of pathogen correlated with decreased photopigment development.

Figure 12:
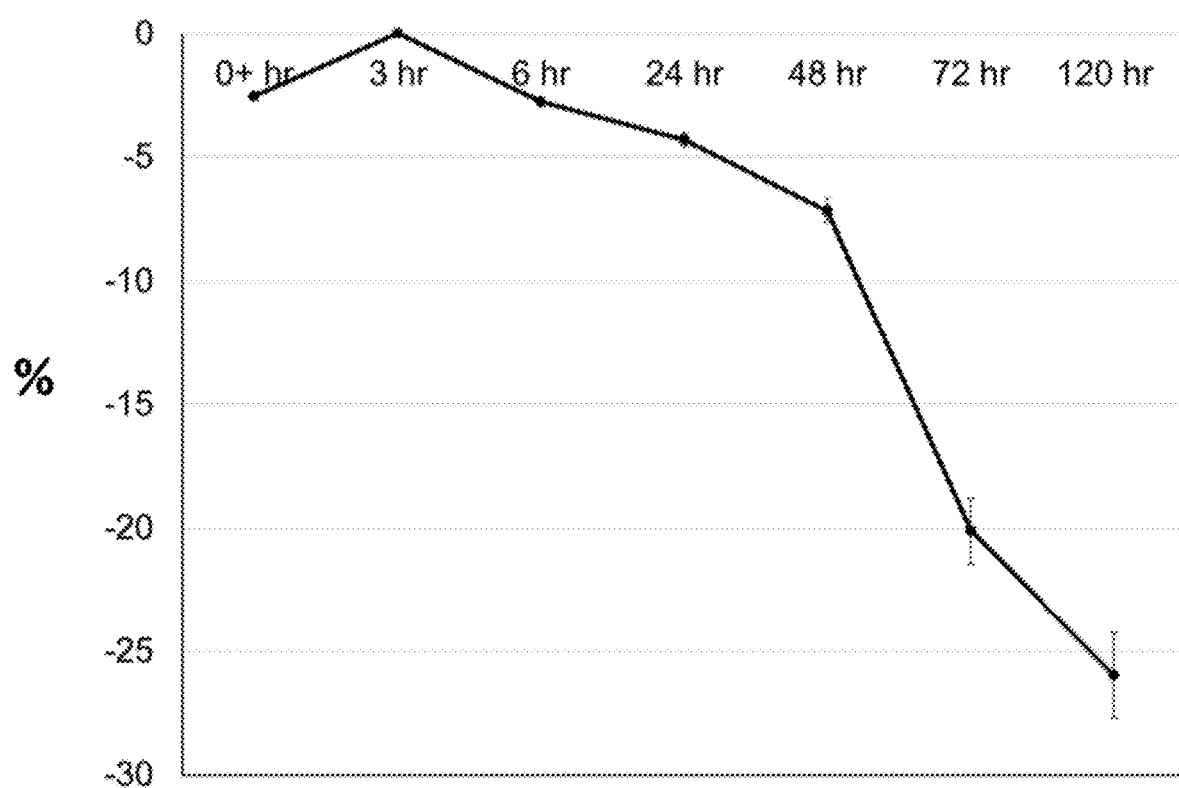
FIG. 12 is the predicted photosynthetic rate over time for Black Seeded Simpson lettuce inoculated with $10^6$ cfu/ml *P. syringae* DC3000. The x-axis represents time post-inoculation in hours. The y-axis represents the calculated percent change in photosynthetic rate.

The VideometerLab® 4 MSI device was then switched to fluorescence imaging. Excitation wavelengths at 645 nm and 660 nm were used with a long pass filter to transmit wavelengths greater than 690 nm. Emission intensity was used to calculate the change in rate of photosynthesis using the equations provided above. The photosystem II emission response showed that control plants had a minimal emission change of about 5% to 8%. However, plants dosed with pathogens at about 10 to 20% from 24 to 48 hours after dosing, and about 20% to 30% by 120 hours post-dosing. FIG. 12 shows the predicted loss in photosynthetic rate for Black Seeded Simpson lettuce inoculated with $10^6$ cfu/ml *P. syringae* DC3000.

Therefore, the MSI methods of the present invention were effective in measuring the stress response in plants infected with pathogens.

I claim:

1. A device for detecting a pathogen on a plant or plant part, the device comprising a light distributing element, a light detection system, a control unit, and a calculating module, wherein:
   a) the light distributing element comprises an integrating cavity comprising a first opening, a second opening, and an inner surface on which is disposed a diffuse reflective coating and on which is mounted a plurality of light sources configured to emit light and illuminate an interior of the integrating cavity, wherein:
      i) the integrating cavity is configured to distribute the light emitted from the plurality of lights sources through the second opening to illuminate an object sample; and
      ii) the second opening is configured to receive reflected light and emitted light from the object sample, the reflected light or emitted light being directed to the first opening;
   b) the light detection system is in optical communication with the first opening and the second opening and configured to receive the light reflected by or emitted by the object sample, the light detection system comprising:
      i) a camera adapted to supply a representation of recorded images to the calculating module; and
      iii) a mirror element in optical alignment with the first opening and the second opening so that an optical axis of the mirror element extends through the first opening and the second opening of the integrating cavity, and wherein the mirror element is configured to divert the light reflected by or emitted by the object sample to the camera;
   c) the control unit is configured to cause each of the plurality of light sources to emit light or not emit light;
   d) the calculating module is configured to perform spectral calibration of the representation and record measurements of light intensity of the representation;
   wherein the plurality of light sources comprises a first light source having a first spectral wavelength in a range of about 250 nm to about 280 nm and a second light source having a second spectral wavelength selected from a range of about 350 nm to about 1000 nm; and
   wherein the object sample is a plant or plant part.

2. The device of claim 1, wherein the device is configured for communication with a central processing unit, wherein, by the central processing unit, the measurements of light intensity of the representation are converted into emission intensity data whereby an increase in emission intensity of the first spectral wavelength by the plant or plant part indicates increased pathogen infection on the plant or plant part as compared to an equivalent plant or plant part with no increase in pathogen infection.

3. The device of claim 1, wherein the plurality of light sources comprises at least one additional light source having an additional spectral wavelength selected from a range of about 350 nm to about 1000 nm, provided that the additional spectral wavelength and the second spectral wavelength are not the same spectral wavelength.

4. The device of claim 1, wherein the second spectral wavelength is in the range from about 360 nm to about 370 nm and wherein the plurality of light sources further comprises:

a third light source having a third spectral wavelength in a range from 400 nm to 410 nm;
a fourth light source having a fourth spectral wavelength in a range from 430 nm to 440 nm;
a fifth light source having a fifth spectral wavelength in a range from 445 nm to 455 nm;
a sixth light source having a sixth spectral wavelength in a range from 465 nm to 475 nm;
a seventh light source having a seventh spectral wavelength in a range from 480 nm to 505 nm;
an eighth light source having an eighth spectral wavelength in a range from 520 nm to 530 nm;
a ninth light source having a ninth spectral wavelength in a range from 545 nm to 555 nm;
a tenth light source having a tenth spectral wavelength in a range from 565 nm to 575 nm;
an eleventh light source having an eleventh spectral wavelength in a range from 585 nm to 600 nm;
a twelfth light source having a twelfth spectral wavelength in a range from 625 nm to 635 nm;
a thirteenth light source having a thirteenth spectral wavelength in a range from 640 nm to 650 nm;
a fourteenth light source having a fourteenth spectral wavelength in a range from 655 nm to 665 nm;
a fifteenth light source having a fifteenth spectral wavelength in a range from 685 nm to 695 nm;
a sixteenth light source having a sixteenth spectral wavelength in a range from 765 nm to 775 nm;
a seventeenth light source having a seventeenth spectral wavelength in a range from 845 nm to 855 nm;
an eighteenth light source having an eighteenth spectral wavelength in a range from 865 nm to 875 nm;
a nineteenth light source having a nineteenth spectral wavelength in a range from 935 nm to 945 nm; and
a twentieth light source having a twentieth spectral wavelength in a range from 965 nm to 975 nm.

5. The device of claim 1, wherein each of the plurality of light sources is an LED light.

6. The device of claim 1, further comprising a light filtering element disposed between the mirror element and the camera, wherein the light filtering element comprises at least one light permissible member and a plurality of light filters, wherein the control unit causes the light filtering element to switch between the light permissible member and each of the light filters in response to a user programmable input, and wherein each of the light filters transmits light having a transmissible spectral wavelength or range of spectral wavelengths selected from about 300 nm to about 1000 nm.

7. The device of claim 1, wherein the control unit causes each individual light source to emit light or not emit light in response to a user programmable input, wherein the control unit causes each individual light source to emit light in succession in response to a user programmable input, wherein each light source emits light for a period of time, and wherein the period of time is from about 0.1 seconds to about 2 seconds.

8. The device of claim 1, wherein:
(i) by a central processing unit, the measurements of light intensity of the representation are converted into reflection intensity data whereby an increase in reflection intensity of a spectral wavelength other than the first spectral wavelength indicates a decrease in photopigment concentration in the plant or plant part; or
(ii) by the central processing unit, the measurements of light intensity of the representation are converted into emission intensity data whereby an increase in emission intensity of a spectral wavelength other than the first spectral wavelength indicates a change in rate of photosynthesis in the plant or plant part; or
(iii) both (i) and (ii).

9. The device of claim 1, wherein the plant or plant part is foliage of clade viridiplantae.

10. A method of detecting a pathogen on a plant or plant part using deep ultraviolet fluorescence and multi spectral imaging, the method comprising:
a) providing a plant or plant part;
b) measuring DUVF emitted from plant or plant part with the device of claim 1, the measuring comprising:
   i) subjecting the plant or plant part to an ultraviolet light having a spectral wavelength in a range of about 210 nm to about 280 nm, wherein the plant or plant part emits a DUVF intensity;
   ii) detecting with a light detection system a first portion of the DUVF intensity, wherein the light detection system comprises a light intensity detector and a first DUVF emission filter configured to transmit the first portion of the DUVF intensity, whereby the first portion of the DUVF intensity is transmitted through the first DUVF emission filter and is detected by the light intensity detector; and
   iii) calculating the first portion of the DUVF intensity, wherein an increase in the first portion of the DUVF intensity indicates a pathogen presence on the plant or plant part as compared to an equivalent plant or plant part without a pathogen presence;
c) measuring light reflected by the plant or plant part with the device of claim 1, the measuring comprising:
   i) subjecting the plant or plant part to a first light having a spectral wavelength in a range of about 350 nm to about 1000 nm, wherein the plant or plant part reflects a portion of the first light to produce a first reflection intensity;
   ii) detecting with the light intensity detector the first reflection intensity; and
   iii) calculating the first reflection intensity, wherein an increase in the first reflection intensity indicates a reduction in photopigment concentration in response to a pathogen presence; and
d) measuring fluorescence emitted from the plant or plant part with the device of claim 1, the measuring comprising:
   i) subjecting the plant or plant part to first excitation light having a spectral wavelength in a range of about 350 nm to about 660 nm, wherein the plant or plant part emits a first fluorescence intensity;
   ii) detecting with the light detection system a portion of the first fluorescence intensity, wherein the light detection system comprises a fluorescence emission filter whereby the portion of the first fluorescence intensity is transmitted through the fluorescence emission filter and is detected by the light intensity detector; and
   iii) calculating the portion of the first fluorescence intensity, wherein an increase in the portion of the first fluorescence intensity indicates a pathogen presence;
wherein steps b), c), and d) can be performed in any order.

11. The method of claim 10, wherein step c) is performed before step d), and step b) is performed following step d).

12. The method of claim 10, wherein the first DUVF emission filter transmits light having a spectral wavelength of about 335 nm to about 345 nm, and wherein the first portion of the DUVF intensity has a spectral wavelength of about 335 nm to about 345 nm.

13. The method of claim 10, further comprising:
  detecting with the light detection system a second portion of the DUVF intensity, wherein the light intensity detector comprises a second DUVF emission filter configured to transmit the second portion of the DUVF intensity having a spectral wavelength of about 355 nm to about 365 nm, whereby the second portion of the DUVF intensity is transmitted through the second DUVF emission filter and is detected by the light intensity detector; and
  calculating the second portion of the DUVF intensity, wherein an increase in the second portion of the DUVF intensity indicates a pathogen presence on the plant or plant part as compared to an equivalent plant or plant part without a pathogen presence.

14. The method of claim 10, wherein the first excitation light has a spectral wavelength in a range selected from group consisting of about 360 nm to about 370 nm, about 400 nm to about 410 nm, 425 nm to about 435 nm, 445 nm to about 455 nm, 625 nm to about 635 nm, 640 nm to about 650 nm, and 655 nm to about 665 nm, and wherein the portion of the first fluorescence intensity has a spectral wavelength of greater than 690 nm.

15. The method of claim 10, wherein step d) further comprises subjecting the plant or plant part to second excitation light, wherein the plant or plant part emits a second fluorescence intensity;
  detecting with the light detection system a portion of the second fluorescence intensity, whereby the portion of the second fluorescence intensity is transmitted through the fluorescence emission filter and is detected by the light intensity detector; and
  calculating the portion of the second fluorescence intensity, wherein an increase in the portion of the second fluorescence intensity indicates a pathogen presence; and
  wherein the second excitation light has a spectral wavelength in a range selected from group consisting of about 360 nm to about 370 nm, about 400 nm to about 410 nm, 425 nm to about 435 nm, 445 nm to about 455 nm, 625 nm to about 635 nm, 640 nm to about 650 nm, and 655 nm to about 665 nm, provided that the spectral wavelength of the second excitation light is not the same as the spectral wavelength of the first excitation light, and wherein the portion of the second fluorescence intensity has a spectral wavelength of greater than 690 nm.

16. The method of claim 10, wherein the first light has a spectral wavelength of about 505 nm to about 535 nm; and wherein step c) further comprises:
  (a) subjecting the plant or plant part to a second light having a spectral wavelength in a range of about 535 nm to about 560 nm, wherein the plant or plant part reflects a portion of the second light to produce a second reflection intensity;
  detecting with the light intensity detector the second reflection intensity; and
  calculating the second reflection intensity, wherein an increase in the second reflection intensity indicates a reduction in photopigment concentration in response to a pathogen presence; and
  (b) subjecting the plant or plant part to a third light having a spectral wavelength in a range of about 560 nm to about 580 nm, wherein the plant or plant part reflects a portion of the third light to produce a third reflection intensity;
  detecting with the light intensity detector the third reflection intensity; and
  calculating the third reflection intensity, wherein an increase in the third reflection intensity indicates a reduction in photopigment concentration in response to a pathogen presence; and
  (c) subjecting the plant or plant part to a fourth light having a spectral wavelength in a range of about 580 nm to about 610 nm, wherein the plant or plant part reflects a portion of the fourth light to produce a fourth reflection intensity;
  detecting with the light intensity detector the fourth reflection intensity; and
  calculating the fourth reflection intensity, wherein an increase in the fourth reflection intensity indicates a reduction in photopigment concentration in response to a pathogen presence.

17. The method of claim 10, wherein:
  (a) the photopigment is chlorophyll; or
  (b) the plant or plant part is of clade viridiplantae; or
  (c) the pathogen is a human pathogen selected from the group consisting of *Erwinia* sp., *Pseudomonas* sp., *Bacillus* sp., *Clostridium* sp., *Klebsiella* sp., *Escherichia* sp., *Salmonella* sp., *Listeria* sp., *Rhizobium* sp., *Sinorhizobium* sp., and any combination thereof; or
  (d) any combination of (a)-(c).

18. The method of claim 10, wherein the portion of the first fluorescence intensity is normalized by the first reflectance intensity to calculate a change in photosynthesis rate according to equation $$\Delta Rate = PCi \times \left(\frac{Reflectance_{(meas)} - Reflectance_{(ctrl)}}{Reflectance_{(ctrl)}}\right) \times Emission\Delta.$$

19. The method of claim 15, wherein the portion of the first fluorescence intensity or the second fluorescence intensity is normalized by the first reflectance intensity to calculate a change in photosynthesis rate according to equation $$\Delta Rate = PCi \times \left(\frac{Reflectance_{(meas)} - Reflectance_{(ctrl)}}{Reflectance_{(ctrl)}}\right) \times Emission\Delta.$$

* * * * *